(12) United States Patent
Costlow et al.

(10) Patent No.: US 11,349,861 B1
(45) Date of Patent: *May 31, 2022

(54) IDENTIFYING NETWORK ENTITIES BASED ON BEACONING ACTIVITY

(71) Applicant: ExtraHop Networks, Inc., Seattle, WA (US)

(72) Inventors: Jeff James Costlow, Kingston, WA (US); Michael Ryan Corder, Seattle, WA (US); Edmund Hope Driggs, Seattle, WA (US); Benjamin Thomas Higgins, Shoreline, WA (US); Michael Kerber Krause Montague, Lake Forest Park, WA (US); Kenneth Perrault, Seattle, WA (US); Jesse Abraham Rothstein, Seattle, WA (US); Jonathan Jacob Scott, Seattle, WA (US); Marc Adam Winners, Seattle, WA (US); Xue Jun Wu, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,866

(22) Filed: Jun. 18, 2021

(51) Int. Cl.
  *H04L 43/062* (2022.01)
  *H04L 9/40* (2022.01)

(52) U.S. Cl.
  CPC ........ *H04L 63/1425* (2013.01); *H04L 43/062* (2013.01); *H04L 63/1416* (2013.01)

(58) Field of Classification Search
  CPC .............. H04L 63/1425; H04L 43/062; H04L 63/1416
  See application file for complete search history.

(56) References Cited

U.S. PATENT DOCUMENTS

| 5,027,269 A | 6/1991 | Grant et al. |
| 5,430,727 A | 7/1995 | Callon |

(Continued)

FOREIGN PATENT DOCUMENTS

| CN | 105071987 A | 11/2015 |
| CN | 106170008 A | 11/2016 |

(Continued)

OTHER PUBLICATIONS

Examination Report for European Patent Application No. 17210996.9 dated May 21, 2021, pp. 1-6.

(Continued)

*Primary Examiner* — Oleg Korsak
(74) *Attorney, Agent, or Firm* — John W. Branch; Branch Partners PLLC

(57) ABSTRACT

Embodiments are directed to monitoring network traffic using network monitoring computers (NMCs). Metrics may be determined based on monitoring network traffic associated with a plurality of entities each associated with a profile that includes the metrics for each entity. Beaconing metrics associated with beaconing activity may be determined based on the metrics. The profile of each entity may be compared with the beaconing metrics to determine the entities that may be engaged in beaconing activity. The entities may be characterized based on beaconing activity such that the beaconing activity includes communication with endpoints associated with the third parties, employing communication protocols associated with the third-parties, or exchanging payloads consistent with the beaconing activity. Reports that include information associated with the entities and its beaconing activity may be generated.

28 Claims, 12 Drawing Sheets

(56) References Cited

U.S. PATENT DOCUMENTS

| | | |
|---|---|---|
| 5,541,995 A | 7/1996 | Normile et al. |
| 5,548,646 A | 8/1996 | Aziz et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,058,429 A | 5/2000 | Ames et al. |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,636,838 B1 | 10/2003 | Perlman et al. |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen |
| 7,047,303 B2 | 5/2006 | Lingafelt et al. |
| 7,089,326 B2 | 8/2006 | Boucher et al. |
| RE39,360 E | 10/2006 | Aziz et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,313,141 B2 | 12/2007 | Kan et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,580,356 B1 | 8/2009 | Mishra et al. |
| 7,602,731 B2 | 10/2009 | Jain |
| 7,606,706 B1 | 10/2009 | Rubin et al. |
| 7,609,630 B2 | 10/2009 | Gobeil |
| 7,594,273 B2 | 11/2009 | Keanini et al. |
| 7,619,988 B2 | 11/2009 | Shimada et al. |
| 7,620,986 B1 | 11/2009 | Jagannathan et al. |
| 7,636,305 B1 | 12/2009 | Taylor et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,185,953 B2 | 5/2012 | Rothstein et al. |
| 8,194,542 B2 | 6/2012 | Väänänen et al. |
| 8,352,725 B1 | 1/2013 | O'Toole, Jr. |
| 8,411,677 B1 | 4/2013 | Colloff |
| 8,418,249 B1 | 4/2013 | Nucci et al. |
| 8,457,127 B2 | 6/2013 | Eastham et al. |
| 8,494,985 B1 | 7/2013 | Keralapura et al. |
| 8,533,254 B1 | 9/2013 | Whitson, Jr. et al. |
| 8,555,383 B1 | 10/2013 | Marhsall et al. |
| 8,578,024 B1 | 11/2013 | Keralapura et al. |
| 8,613,089 B1 | 12/2013 | Holloway et al. |
| 8,619,579 B1 | 12/2013 | Rothstein et al. |
| 8,627,422 B2 | 1/2014 | Hawkes et al. |
| 8,635,441 B2 | 1/2014 | Frenkel et al. |
| 8,707,440 B2 | 4/2014 | Gula et al. |
| 8,744,894 B2 | 6/2014 | Christiansen et al. |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,964,548 B1 | 2/2015 | Keralapura et al. |
| 8,971,196 B2 | 3/2015 | Degioanni et al. |
| 9,026,467 B2 | 5/2015 | Bammi et al. |
| 9,036,493 B2 | 5/2015 | Degioanni et al. |
| 9,049,216 B2 | 6/2015 | McCanne et al. |
| 9,083,740 B1 | 7/2015 | Ma et al. |
| 9,094,288 B1 | 7/2015 | Nucci et al. |
| 9,094,326 B2 | 7/2015 | Sundararajan et al. |
| 9,158,604 B1 | 10/2015 | Christodorescu et al. |
| 9,176,838 B2 | 11/2015 | Li et al. |
| 9,183,573 B2 | 11/2015 | Tseng |
| 9,189,318 B2 | 11/2015 | Li et al. |
| 9,191,400 B1 | 11/2015 | Ptasinski et al. |
| 9,203,865 B2 | 12/2015 | Linden et al. |
| 9,264,288 B1 | 2/2016 | Arora et al. |
| 9,338,147 B1 | 5/2016 | Rothstein et al. |
| 9,357,410 B2 | 5/2016 | Nedeitchev et al. |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 | 7/2016 | Guo et al. |
| 9,426,036 B1 | 8/2016 | Roy |
| 9,430,646 B1 | 8/2016 | Mushtaq et al. |
| 9,432,430 B1 | 8/2016 | Klenz |
| 9,460,299 B2 * | 10/2016 | Weiss .................. G06F 21/604 |
| 9,461,875 B2 | 10/2016 | Groat et al. |
| 9,479,405 B1 | 10/2016 | Tongaonkar et al. |
| 9,483,742 B1 | 11/2016 | Ahmed |
| 9,516,053 B1 | 12/2016 | Muddu et al. |
| 9,531,736 B1 | 12/2016 | Torres et al. |
| 9,565,202 B1 | 2/2017 | Kindlund et al. |
| 9,591,015 B1 | 3/2017 | Amin et al. |
| 9,621,523 B2 | 4/2017 | Rothstein et al. |
| 9,654,503 B1 | 5/2017 | Kowalyshyn |
| 9,660,879 B1 | 5/2017 | Rothstein et al. |
| 9,692,658 B2 | 6/2017 | Guo et al. |
| 9,715,820 B1 | 7/2017 | Boss et al. |
| 9,729,416 B1 | 8/2017 | Khanal et al. |
| 9,876,810 B2 | 1/2018 | McDougal et al. |
| 9,888,021 B2 | 2/2018 | Horesh et al. |
| 9,893,897 B2 | 2/2018 | Li et al. |
| 9,967,292 B1 * | 5/2018 | Higgins ............. H04L 63/0218 |
| 10,009,364 B2 | 6/2018 | Dasgupta et al. |
| 10,009,793 B2 | 6/2018 | Wetterwald et al. |
| 10,027,689 B1 | 7/2018 | Rathor et al. |
| 10,028,167 B2 | 7/2018 | Calin et al. |
| 10,033,766 B2 | 7/2018 | Gupta et al. |
| 10,038,611 B1 | 7/2018 | Wu et al. |
| 10,063,434 B1 | 8/2018 | Khanal et al. |
| 10,176,323 B2 | 1/2019 | Zhang et al. |
| 10,198,667 B2 | 2/2019 | Ryan, Jr. et al. |
| 10,204,211 B2 * | 2/2019 | Hammerle ......... H04L 47/2441 |

(56) References Cited

U.S. PATENT DOCUMENTS

| | | |
|---|---|---|
| 10,237,294 B1 | 3/2019 | Zadeh et al. |
| 10,263,883 B2 | 4/2019 | Kamble |
| 10,264,003 B1 * | 4/2019 | Wu ..................... H04L 41/0681 |
| 10,277,618 B1 | 4/2019 | Wu et al. |
| 10,320,749 B2 | 6/2019 | Sengupta et al. |
| 10,321,344 B2 | 6/2019 | Barton et al. |
| 10,326,676 B1 * | 6/2019 | Driggs ................. H04L 43/062 |
| 10,332,005 B1 | 6/2019 | Liao et al. |
| 10,348,767 B1 | 7/2019 | Lee et al. |
| 10,375,155 B1 | 8/2019 | Cai et al. |
| 10,389,574 B1 | 8/2019 | Wu et al. |
| 10,411,978 B1 | 9/2019 | Ball et al. |
| 10,412,080 B1 | 9/2019 | Edwards et al. |
| 10,419,454 B2 | 9/2019 | El-Moussa et al. |
| 10,536,268 B2 | 1/2020 | Anderson et al. |
| 10,536,475 B1 | 1/2020 | McCorkle, Jr. et al. |
| 10,554,665 B1 | 2/2020 | Badawy et al. |
| 10,581,915 B2 | 3/2020 | Scherman et al. |
| 10,594,664 B2 | 3/2020 | Zaifman et al. |
| 10,594,718 B1 | 3/2020 | Deaguero et al. |
| 10,742,677 B1 * | 8/2020 | Wu ..................... H04L 63/1408 |
| 10,805,338 B2 | 10/2020 | Kohout et al. |
| 10,841,194 B2 | 11/2020 | Kim et al. |
| 10,992,693 B2 | 4/2021 | Luo et al. |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0175934 A1 | 11/2002 | Hand et al. |
| 2002/0184362 A1 | 12/2002 | Banerjee et al. |
| 2002/0199098 A1 | 12/2002 | Davis |
| 2003/0014628 A1 | 1/2003 | Freed et al. |
| 2003/0018891 A1 | 1/2003 | Hall et al. |
| 2003/0023733 A1 | 1/2003 | Lingafelt et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0156715 A1 | 8/2003 | Reeds, III et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0050316 A1 | 3/2005 | Peles |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0111367 A1 | 5/2005 | Jonathan Chao et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2005/0270975 A1 | 12/2005 | Meylan et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130659 A1 | 6/2008 | Polland |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0172416 A1 | 7/2008 | Ito |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0168657 A1 | 7/2009 | Puri et al. |
| 2009/0187653 A1 | 7/2009 | Fu et al. |
| 2009/0220080 A1 | 9/2009 | Herne et al. |

(56) References Cited

U.S. PATENT DOCUMENTS

| | | |
|---|---|---|
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0126259 A1 | 5/2011 | Krishnamurthi et al. |
| 2011/0126275 A1 | 5/2011 | Anderson et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0280149 A1 | 11/2011 | Okada et al. |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Tönsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baiiga et al. |
| 2012/0243533 A1 | 9/2012 | Leong |
| 2012/0278477 A1 | 11/2012 | Terrell et al. |
| 2012/0278625 A1 | 11/2012 | Narayanan et al. |
| 2012/0278890 A1 | 11/2012 | Määttä et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1 | 8/2013 | Bhaskaran et al. |
| 2013/0212297 A1 | 8/2013 | Varga |
| 2013/0227259 A1 | 8/2013 | Kim |
| 2013/0232104 A1 | 9/2013 | Goyal et al. |
| 2013/0262655 A1 | 10/2013 | Deschênes et al. |
| 2013/0305357 A1 | 11/2013 | Ayyagari et al. |
| 2013/0339514 A1 | 12/2013 | Crank et al. |
| 2013/0347018 A1 | 12/2013 | Limp et al. |
| 2014/0020067 A1 | 1/2014 | Kim et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0189093 A1 | 7/2014 | du Toit |
| 2014/0222998 A1 | 8/2014 | Vasseur et al. |
| 2014/0223325 A1 | 8/2014 | Melendez et al. |
| 2014/0241164 A1 | 8/2014 | Cociglio et al. |
| 2014/0242972 A1 | 8/2014 | Siotznick |
| 2014/0258511 A1 | 9/2014 | Sima et al. |
| 2014/0269777 A1 | 9/2014 | Rothstein et al. |
| 2014/0304211 A1 | 10/2014 | Horvitz |
| 2014/0310392 A1 | 10/2014 | Ho |
| 2014/0317288 A1 | 10/2014 | Krueger et al. |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0007316 A1 | 1/2015 | Ben-Shalom et al. |
| 2015/0023168 A1 | 1/2015 | Kotecha et al. |
| 2015/0026027 A1 | 1/2015 | Priess et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0100780 A1 | 4/2015 | Rubin et al. |
| 2015/0106616 A1 | 4/2015 | Nix |
| 2015/0106930 A1 | 4/2015 | Honda et al. |
| 2015/0113588 A1 | 4/2015 | Wing et al. |
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0269358 A1 | 9/2015 | Hesketh et al. |
| 2015/0277802 A1 | 10/2015 | Oikarinen et al. |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0119215 A1 | 4/2016 | Deschênes et al. |
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |

(56) References Cited

U.S. PATENT DOCUMENTS

| | | |
|---|---|---|
| 2016/0226913 A1 | 8/2016 | Sood et al. |
| 2016/0241574 A1 | 8/2016 | Kumar et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0366020 A1 | 12/2016 | Ramachandran et al. |
| 2016/0373414 A1 | 12/2016 | MacCarthaigh |
| 2016/0380885 A1 | 12/2016 | Jani et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085590 A1 | 3/2017 | Hsu et al. |
| 2017/0090906 A1* | 3/2017 | Reynolds ............... G06F 16/182 |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1 | 10/2017 | Mandyam |
| 2017/0289847 A1 | 10/2017 | Wetterwald et al. |
| 2017/0310703 A1 | 10/2017 | Ackerman et al. |
| 2017/0353437 A1 | 12/2017 | Ayyadevara et al. |
| 2017/0353477 A1 | 12/2017 | Faigon et al. |
| 2017/0364794 A1 | 12/2017 | Mahkonen et al. |
| 2017/0366526 A1 | 12/2017 | Wood et al. |
| 2018/0007087 A1 | 1/2018 | Grady et al. |
| 2018/0013650 A1 | 1/2018 | Khanal et al. |
| 2018/0033089 A1 | 2/2018 | Goldman et al. |
| 2018/0084011 A1 | 3/2018 | Joseph et al. |
| 2018/0091413 A1 | 3/2018 | Richards et al. |
| 2018/0091534 A1 | 3/2018 | Dubrovsky et al. |
| 2018/0103056 A1 | 4/2018 | Kohout et al. |
| 2018/0109507 A1 | 4/2018 | Caldera et al. |
| 2018/0109557 A1 | 4/2018 | Yeo et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0351781 A1 | 12/2018 | Movsisyan et al. |
| 2018/0351970 A1 | 12/2018 | Majumder et al. |
| 2018/0375893 A1 | 12/2018 | Jordan et al. |
| 2019/0005205 A1* | 1/2019 | Dargar ............... G06F 21/121 |
| 2019/0007283 A1 | 1/2019 | Kieviet et al. |
| 2019/0012441 A1 | 1/2019 | Tuli et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1* | 2/2019 | Khanal ............... H04L 43/04 |
| 2019/0095478 A1 | 3/2019 | Tankersley et al. |
| 2019/0102469 A1 | 4/2019 | Makovsky et al. |
| 2019/0121979 A1 | 4/2019 | Chari et al. |
| 2019/0132359 A1 | 5/2019 | Kraenzel et al. |
| 2019/0163678 A1 | 5/2019 | Bath et al. |
| 2019/0171725 A1 | 6/2019 | Shen et al. |
| 2019/0196912 A1 | 6/2019 | Didehban et al. |
| 2019/0236149 A1 | 8/2019 | Kuruvada et al. |
| 2019/0245734 A1 | 8/2019 | Wu et al. |
| 2019/0245763 A1 | 8/2019 | Wu et al. |
| 2019/0266999 A1 | 8/2019 | Chandrasekaran et al. |
| 2019/0303198 A1 | 10/2019 | Kim et al. |
| 2019/0372828 A1 | 12/2019 | Wu et al. |
| 2020/0034528 A1 | 1/2020 | Yang et al. |
| 2020/0067952 A1 | 2/2020 | Deaguero |
| 2020/0220849 A1 | 7/2020 | Zaifman et al. |
| 2020/0236131 A1 | 7/2020 | Vejman et al. |
| 2020/0287885 A1 | 9/2020 | Rodniansky |
| 2020/0389469 A1 | 12/2020 | Litichever et al. |
| 2021/0006589 A1 | 1/2021 | Kohout et al. |
| 2021/0185087 A1* | 6/2021 | Wu ............... H04L 43/062 |
| 2021/0250368 A1 | 8/2021 | Hearty et al. |
| 2021/0288993 A1 | 9/2021 | Kraning et al. |

FOREIGN PATENT DOCUMENTS

| | | |
|---|---|---|
| CN | 109104441 A | 12/2018 |
| CN | 109542772 A1 | 3/2019 |
| CN | 110113349 A | 8/2019 |
| CN | 112085039 A | 12/2020 |
| CN | 112398876 A1 | 2/2021 |
| DE | 69553953 T2 | 4/2006 |
| EP | 0702477 A2 | 3/1996 |
| EP | 0702477 A3 | 7/1999 |
| EP | 1026867 A2 | 8/2000 |
| EP | 0702477 B1 | 1/2005 |
| EP | 2057576 A2 | 5/2009 |
| EP | 2057576 A4 | 4/2012 |
| EP | 3089424 A1 | 11/2016 |
| EP | 3113443 A1 | 1/2017 |
| EP | 3306890 A1 | 4/2018 |
| KR | 960012819 A | 4/1996 |
| KR | 100388606 B1 | 11/2003 |
| KR | 20140093060 A | 7/2014 |
| KR | 101662614 B1 | 10/2016 |
| WO | 2008026212 A2 | 3/2008 |
| WO | 2008026212 A3 | 3/2008 |
| WO | 2009015461 A1 | 2/2009 |
| WO | 2016118131 A1 | 7/2016 |
| WO | 2016144932 A1 | 9/2016 |

OTHER PUBLICATIONS

Office Communication for U.S. Appl. No. 16/525,290 dated Jul. 9, 2021, pp. 1-7.
Office Communication for U.S. Appl. No. 16/679,055 dated Jul. 26, 2021, pp. 1-34.
Office Communication for U.S. Appl. No. 16/718,050 dated Jul. 27, 2021, pp. 1-23.
Office Communication for U.S. Appl. No. 15/971,843 dated Jul. 28, 2021, pp. 1-9.
Office Communication for U.S. Appl. No. 15/585,887 dated Aug. 17, 2021, pp. 1-41.
Office Communication for U.S. Appl. No. 13/831,673 dated Sep. 30, 2013, pp. 1-10.
Office Communication for U.S. Appl. No. 13/831,673 dated Mar. 6, 2014, pp. 1-12.
Office Communication for U.S. Appl. No. 13/831,673 dated May 22, 2014, pp. 1-5.
Office Communication for U.S. Appl. No. 13/831,626 dated Sep. 3, 2013, pp. 1-17.
Office Communication for U.S. Appl. No. 13/831,959 dated Aug. 22, 2013, pp. 1-9.

(56) References Cited

OTHER PUBLICATIONS

Handel, Theodore G. et al., "Hiding data in the OSI network model." In: Anderson R. (eds) Information Hiding. IH 1996. Lecture Notes in Computer Science, vol. 1174. Springer, Berlin, Heidelberg. pp. 23-38.
Office Communication for U.S. Appl. No. 14/500,893 dated Nov. 20, 2014, pp. 1-15.
Office Communication for U.S. Appl. No. 14/107,580 dated Mar. 6, 2014, pp. 1-13.
Office Communication for U.S. Appl. No. 14/107,580 dated Sep. 15, 2014, pp. 1-15.
Office Communication for U.S. Appl. No. 13/831,908 dated Aug. 9, 2013, pp. 1-29.
Office Communication for U.S. Appl. No. 13/831,908 dated Jan. 13, 2014, pp. 1-31.
Office Communication for U.S. Appl. No. 13/831,908 dated Apr. 9, 2014, pp. 1-3.
Office Communication for U.S. Appl. No. 13/831,908 dated Jun. 25, 2014, pp. 1-15.
Office Communication for U.S. Appl. No. 14/518,996 dated Nov. 20, 2014, pp. 1-41.
Office Communication for U.S. Appl. No. 14/107,631 dated Feb. 20, 2014, pp. 1-16.
Office Communication for U.S. Appl. No. 14/107,631 dated Sep. 26, 2014, pp. 1-14.
Office Communication for U.S. Appl. No. 14/107,631 dated Dec. 30, 2014, pp. 1-12.
Handley, Mark et al., "Network Intrusion Detection: Evasion, Traffic Normalization, and End-to-end Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, Juan Antonio Cordero, "Evaluation of OSPF Extensions in MANET Routing," Paris, 2007, pp. 1-192.
Parsons, Christopher, "Moving Across the Internet: Code-Bodies, Code-Corpses, and Network Architecture," May 9, 2010, pp. 1-20.
Zander, Sebastian et al., "Covert Channels and Countermeasures in Computer Network Protocols," Dec. 2007, pp. 1-7.
Office Communication for U.S. Appl. No. 14/107,580 dated Mar. 17, 2015, pp. 1-5.
Lin, Mark, "An Overview of Session Hijacking at the Network and Application Levels," Jan. 18, 2005, pp. 1-16.
U.S. Appl. No. 11/683,643, filed Mar. 8, 2007, pp. 1-48.
U.S. Appl. No. 11/679,356, filed Feb. 27, 2007, pp. 1-45.
Office Communication for U.S. Appl. No. 12/326,672 dated Jun. 9, 2010, pp. 1-9.
Office Communication for U.S. Appl. No. 12/326,672 dated Dec. 23, 2010, pp. 1-15.
Office Communication for U.S. Appl. No. 12/326,672 dated Jun. 22, 2011, pp. 1-16.
Office Communication for U.S. Appl. No. 12/326,672 dated Oct. 24, 2011, pp. 1-9.
Office Communication for U.S. Appl. No. 11/683,643 dated Apr. 28, 2010, pp. 1-35.
Office Communication for U.S. Appl. No. 11/683,643 dated Oct. 14, 2010, pp. 1-43.
Office Communication for U.S. Appl. No. 11/683,643 dated Aug. 25, 2011, pp. 1-43.
Office Communication for U.S. Appl. No. 15/014,932 dated Jan. 23, 2012, pp. 1-22.
Office Communication for U.S. Appl. No. 15/014,932 dated Jun. 10, 2016, pp. 1-20.
Office Communication for U.S. Appl. No. 15/207,213 dated Oct. 25, 2016, pp. 1-18.
Office Communication for U.S. Appl. No. 15/014,932 dated Dec. 14, 2016, pp. 1-26.
Digital Imaging and Communications in Medicine (DICOM), Part 6: Data Dictionary, PS 3.6-2011, 2011, http://dicom.nema.org/Dicom/2011/11_06pu.pdf, pp. 1-216.
Health Level Seven, Version 2.6, Appendix A. Nov. 2007, https://www.hl7.org/special/committees/vocab/V26_Appendix_A.pdf, pp. 1-255.
Office Communication for U.S. Appl. No. 15/207,213 dated Feb. 23, 2017, pp. 1-24.
Office Communication for U.S. Appl. No. 15/014,932 dated Mar. 3, 2017, pp. 1-6.
Office Communication for U.S. Appl. No. 15/207,213 dated May 8, 2017, pp. 1-6.
Office Communication for U.S. Appl. No. 15/207,213 dated Jun. 1, 2017, pp. 1-24.
Office Communication for U.S. Appl. No. 15/014,932 dated Aug. 1, 2017, pp. 1-27.
Office Communication for U.S. Appl. No. 15/690,135 dated Jan. 18, 2018, pp. 1-6.
Office Communication for U.S. Appl. No. 15/891,311 dated Apr. 23, 2018, pp. 1-18.
Office Communication for U.S. Appl. No. 15/892,327 dated Apr. 23, 2018, pp. 1-6.
Office Communication for U.S. Appl. No. 15/014,932 dated May 15, 2018, pp. 1-23.
Office Communication for U.S. Appl. No. 15/891,273 dated Jun. 19, 2018, pp. 1-20.
Office Communication for U.S. Appl. No. 15/014,932 dated Jul. 16, 2018, pp. 1-4.
Office Communication for U.S. Appl. No. 15/690,135 dated May 22, 2018, pp. 1-7.
Office Communication for U.S. Appl. No. 15/984,197 dated Aug. 31, 2018, pp. 1-25.
Office Communication for U.S. Appl. No. 15/891,311 dated Sep. 24, 2018, pp. 1-14.
Office Communication for U.S. Appl. No. 16/048,939 dated Sep. 19, 2018, pp. 1-9.
Office Communication for U.S. Appl. No. 16/113,442 dated Nov. 6, 2018, pp. 1-10.
Office Communication for U.S. Appl. No. 16/100,116 dated Nov. 15, 2018, pp. 1-7.
Office Communication for U.S. Appl. No. 15/014,932 dated Nov. 23, 2018, pp. 1-10.
Office Communication for U.S. Appl. No. 16/107,509 dated Oct. 26, 2018, pp. 1-26.
Office Communication for U.S. Appl. No. 15/891,273 dated Jan. 15, 2019, pp. 1-23.
Office Communication for U.S. Appl. No. 15/891,311 dated Jan. 29, 2019, pp. 1-8.
Office Communication for U.S. Appl. No. 16/174,051 dated Jan. 29, 2019, pp. 1-21.
Office Communication for U.S. Appl. No. 15/671,060 dated May 8, 2019, pp. 1-19.
Office Communication for U.S. Appl. No. 16/113,442 dated Jun. 5, 2019, pp. 1-8.
Office Communication for U.S. Appl. No. 15/891,273 dated May 28, 2019, pp. 1-14.
Office Communication for U.S. Appl. No. 16/107,509 dated Apr. 1, 2019, pp. 1-21.
Office Communication for U.S. Appl. No. 16/048,939 dated Jun. 20, 2019, pp. 1-8.
Office Communication for U.S. Appl. No. 16/100,116 dated May 30, 2019, pp. 1-5.
Office Communication for U.S. Appl. No. 16/384,574 dated May 31, 2019, pp. 1-12.
Office Communication for U.S. Appl. No. 16/107,509 dated Jun. 14, 2019, pp. 1-5.
Office Communication for U.S. Appl. No. 16/107,509 dated Aug. 21, 2019, pp. 1-25.
Office Communication for U.S. Appl. No. 16/384,574 dated Oct. 8, 2019, pp. 1-13.
Office Communication for U.S. Appl. No. 16/543,243 dated Sep. 27, 2019, pp. 1-24.
Office Communication for U.S. Appl. No. 16/048,939 dated Dec. 5, 2019, pp. 1-9.
Office Communication for U.S. Appl. No. 16/565,109 dated Nov. 27, 2019, pp. 1-18.

(56) References Cited

OTHER PUBLICATIONS

Office Communication for U.S. Appl. No. 16/525,290 dated Oct. 31, 2019, pp. 1-9.
Office Communication for U.S. Appl. No. 16/532,275 dated Oct. 24, 2019, pp. 1-29.
Office Communication for U.S. Appl. No. 16/560,886 dated Dec. 6, 2019, pp. 1-17.
Office Communication for U.S. Appl. No. 14/500,893 dated Feb. 18, 2015, pp. 1-11.
Office Communication for U.S. Appl. No. 14/518,996 dated Apr. 20, 2015, pp. 1-37.
Office Communication for U.S. Appl. No. 14/500,893 dated Jun. 15, 2015, pp. 1-12.
Office Communication for U.S. Appl. No. 14/518,996 dated Jul. 21, 2015, pp. 1-17.
Office Communication for U.S. Appl. No. 14/695,690 dated Sep. 9, 2015, pp. 1-41.
Office Communication for U.S. Appl. No. 14/695,690 dated Feb. 24, 2016, pp. 1-11.
Office Communication for U.S. Appl. No. 15/150,354 dated Jul. 5, 2016, pp. 1-18.
Mozilla Developer Network, "NSS Key Log Format," https://developer.mozilla.org/en-US/docs/Mozilla/Projects/NSS/Key_Log_Format, Jan. 8, 2010, p. 1.
Extended European Search Report for European Patent Application 16166907.2 dated Sep. 30, 2016, pp. 1-7.
Office Communication for U.S. Appl. No. 15/150,354 dated Feb. 8, 2017, pp. 1-8.
Office Communication for U.S. Appl. No. 15/466,248 dated Jun. 5, 2017, pp. 1-30.
Office Communication for U.S. Appl. No. 15/466,248 dated Oct. 3, 2017, pp. 1-34.
Office Communication for U.S. Appl. No. 15/457,886 dated Jan. 5, 2018, pp. 1-11.
Office Communication for U.S. Appl. No. 15/466,248 dated Jan. 11, 2018, pp. 1-2.
Examination Report for European Patent Application No. 16166907.2 dated Mar. 9, 2018, pp. 1-4.
Shaver, Jim, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Office Communication for U.S. Appl. No. 15/466,248 dated Mar. 8, 2018, pp. 1-34.
Office Communication for U.S. Appl. No. 15/457,886 dated Jul. 18, 2018, pp. 1-11.
Office Communication for U.S. Appl. No. 15/466,248 dated Jul. 11, 2018, pp. 1-31.
International Search Report and Written Opinion for International Patent Application No. PCT/US2017/068585 dated Jul. 4, 2018, pp. 1-11.
Extended European Search Report for European Patent Application No. 17210995.1 dated Jul. 6, 2018, pp. 1-11.
Office Communication for U.S. Appl. No. 15/466,248 dated Oct. 18, 2018, pp. 1-31.
Office Communication for U.S. Appl. No. 15/457,886 dated Mar. 20, 2019, pp. 1-9.
Office Communication for U.S. Appl. No. 15/466,248 dated May 16, 2019, pp. 1-33.
Office Communication for U.S. Appl. No. 15/466,248 dated Sep. 10, 2019, pp. 1-27.
Office Communication for U.S. Appl. No. 15/971,843 dated Oct. 22, 2019, pp. 1-15.
Office Communication for U.S. Appl. No. 14/750,905 dated Sep. 22, 2015, pp. 1-12.
Office Communication for U.S. Appl. No. 14/750,905 dated Jan. 19, 2016, pp. 1-5.
Office Communication for U.S. Appl. No. 15/082,925 dated Sep. 13, 2016, pp. 1-7.
Office Communication for U.S. Appl. No. 15/289,760 dated Dec. 12, 2016, pp. 1-12.
Office Communication for U.S. Appl. No. 15/219,016 dated Nov. 22, 2016, pp. 1-12.
Office Communication for U.S. Appl. No. 15/356,381 dated Jan. 6, 2017, pp. 1-57.
Office Communication for U.S. Appl. No. 15/082,925 dated Feb. 1, 2017, pp. 1-6.
Office Communication for U.S. Appl. No. 15/219,016 dated Mar. 16, 2017, pp. 1-9.
Office Communication for U.S. Appl. No. 15/443,868 dated Apr. 27, 2017, pp. 1-7.
Office Communication for U.S. Appl. No. 15/585,887 dated Jun. 27, 2017, pp. 1-24.
Office Communication for U.S. Appl. No. 15/356,381 dated Jul. 3, 2017, pp. 1-21.
Office Communication for U.S. Appl. No. 15/675,216 dated Jun. 7, 2018, pp. 1-4.
Office Communication for U.S. Appl. No. 15/443,868 dated Aug. 11, 2017, pp. 1-11.
Office Communication for U.S. Appl. No. 15/675,216 dated Nov. 20, 2017, pp. 1-7.
Office Communication for U.S. Appl. No. 15/585,887 dated Nov. 28, 2017, pp. 1-23.
International Search Report and Written Opinion for International Patent Application No. PCT/US2018/030145 dated Aug. 10, 2018, pp. 1-12.
Svoboda, Jakub, "Network Traffic Analysis with Deep Packet Inspection Method," Masaryk University, Faculty of Informatics, Master's Thesis, 2014, pp. 1-74.
International Search Report and Written Opinion for International Patent Application No. PCT/US2017/068586 dated Aug. 9, 2018, pp. 1-14.
Extended European Search Report for European Patent Application No. 17210996.9 dated Jun. 13, 2018, pp. 1-7.
Office Communication for U.S. Appl. No. 15/855,769 dated Feb. 5, 2019, pp. 1-10.
Office Communication for U.S. Appl. No. 15/855,769 dated May 1, 2019, pp. 1-7.
Office Communication for U.S. Appl. No. 16/459,472 dated Aug. 14, 2019, pp. 1-15.
Office Communication for U.S. Appl. No. 15/585,887 dated Mar. 20, 2019, pp. 1-26.
Office Communication for U.S. Appl. No. 15/675,216 dated Aug. 28, 2018, pp. 1-14.
Office Communication for U.S. Appl. No. 15/675,216 dated Jan. 29, 2019, pp. 1-8.
Office Communication for U.S. Appl. No. 16/384,697 dated May 30, 2019, pp. 1-12.
Office Communication for U.S. Appl. No. 16/384,574 dated Jan. 13, 2020, pp. 1-9.
Office Communication for U.S. Appl. No. 16/107,509 dated Jan. 23, 2020, pp. 1-12.
Office Communication for U.S. Appl. No. 15/585,887 dated Jan. 22, 2020, pp. 1-28.
Office Communication for U.S. Appl. No. 16/384,697 dated Oct. 17, 2019, pp. 1-8.
Office Communication for U.S. Appl. No. 16/459,472 dated Feb. 3, 2020, pp. 1-7.
Office Communication for U.S. Appl. No. 16/679,055 dated Feb. 14, 2020, pp. 1-32.
Office Communication for U.S. Appl. No. 16/048,939 dated Feb. 18, 2020, pp. 1-6.
Office Communication for U.S. Appl. No. 16/424,387 dated Feb. 24, 2020, pp. 1-15.
Office Communication for U.S. Appl. No. 16/718,050 dated Feb. 27, 2020, pp. 1-21.
Wade, Susan Marie, ""SCADA Honeynets: The attractiveness of honeypots as critical infrastructure security tools for the detection and analysis of advanced threats"" (2011). Graduate Theses and Dissertations. 12138. https://lib.dr.Iastate.edu/etd/12138, pp. 1-67.
Office Communication for U.S. Appl. No. 16/525,290 dated Mar. 12, 2020, pp. 1-10.
Office Communication for U.S. Appl. No. 15/971,843 dated Mar. 26, 2020, pp. 1-14.

(56) References Cited

OTHER PUBLICATIONS

Office Communication for U.S. Appl. No. 16/048,939 dated Mar. 26, 2020, pp. 1-6.
Office Communication for U.S. Appl. No. 16/543,243 dated Apr. 7, 2020, pp. 1-22.
Office Communication for U.S. Appl. No. 16/532,275 dated Apr. 20, 2020, pp. 1-8.
Office Communication for U.S. Appl. No. 16/560,886 dated Apr. 22, 2020, pp. 1-10.
Office Communication for U.S. Appl. No. 16/565,109 dated May 8, 2020, pp. 1-19.
Examination Report for European Patent Application No. 16166907.2 dated Dec. 19, 2019, pp. 1-6.
Examination Report for European Patent Application No. 17210996.9 dated May 27, 2020, pp. 1-3.
Office Communication for U.S. Appl. No. 15/585,887 dated Aug. 28, 2020, pp. 1-30.
Office Communication for U.S. Appl. No. 16/679,055 dated Sep. 4, 2020, pp. 1-5.
Office Communication for U.S. Appl. No. 16/718,050 dated Sep. 4, 2020, pp. 1-23.
Office Communication for U.S. Appl. No. 16/525,290 dated Sep. 23, 2020, pp. 1-10.
International Search Report and Written Opinion for International Patent Application No. PCT/US2019/030015 dated Aug. 7, 2019, pp. 1-6.
International Search Report and Written Opinion for International Patent Application No. PCT/US2019/018097 dated May 28, 2019, pp. 1-9.
Office Communication for U.S. Appl. No. 15/971,843 dated Oct. 27, 2020, pp. 1-11.
Office Communication for U.S. Appl. No. 16/424,387 dated Nov. 24, 2020, pp. 1-23.
Office Communication for U.S. Appl. No. 16/543,243 dated Dec. 16, 2020, pp. 1-13.
Office Communication for U.S. Appl. No. 16/565,109 dated Jan. 19, 2021, pp. 1-9.
Office Communication for U.S. Appl. No. 16/813,649 dated Feb. 24, 2021, pp. 1-7.
Office Communication for U.S. Appl. No. 16/679,055 dated Mar. 16, 2021, pp. 1-33.
Office Communication for U.S. Appl. No. 15/585,887 dated Mar. 26, 2021, pp. 1-31.
Office Communication for U.S. Appl. No. 16/525,290 dated Mar. 31, 2021, pp. 1-11.
Office Communication for U.S. Appl. No. 15/971,843 dated May 5, 2021, pp. 1-9.
Office Communication for U.S. Appl. No. 16/820,582 dated May 10, 2021, pp. 1-24.
Office Communication for U.S. Appl. No. 16/525,290 dated Jun. 15, 2021, pp. 1-4.
Office Communication for U.S. Appl. No. 16/820,582 dated Sep. 27, 2021, pp. 1-25.
Office Communication for U.S. Appl. No. 16/679,055 dated Oct. 12, 2021, pp. 1-3.
Office Communication for U.S. Appl. No. 17/337,299 dated Oct. 21, 2021, pp. 1-34.
Office Communication for U.S. Appl. No. 15/585,887 dated Nov. 2, 2021, pp. 1-4.
Office Communication for U.S. Appl. No. 16/679,055 dated Nov. 12, 2021, pp. 1-34.
Office Communication for U.S. Appl. No. 17/483,435 dated Nov. 30, 2021, pp. 1-21.
Office Communication for U.S. Appl. No. 17/483,148 dated Dec. 13, 2021, pp. 1-28.
Office Communication for U.S. Appl. No. 16/813,649 dated Dec. 20, 2021, pp. 1-44.
Office Communication for U.S. Appl. No. 17/226,947 dated Dec. 30, 2021, pp. 1-6.
Office Communication for U.S. Appl. No. 16/820,582 dated Jan. 14, 2022, pp. 1-13.
Office Communication for U.S. Appl. No. 16/989,025 dated Jan. 19, 2022, pp. 1-12.

* cited by examiner

IDENTIFYING NETWORK ENTITIES BASED ON BEACONING ACTIVITY

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

Networks of organizations often are attacked by malicious actors from external or internal locations. Vigilant organizations employ a variety of defenses or security mechanisms to help ensure the safety or integrity of their networks or the data stored on networked devices or computers. However, identifying various entities in the monitored networks or their roles in the monitored networks may be confounded by encryption technologies that may obscure some characteristics of the network traffic that occurs in the monitored networks, including network traffic that may be inbound or outbound from the monitored networks. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
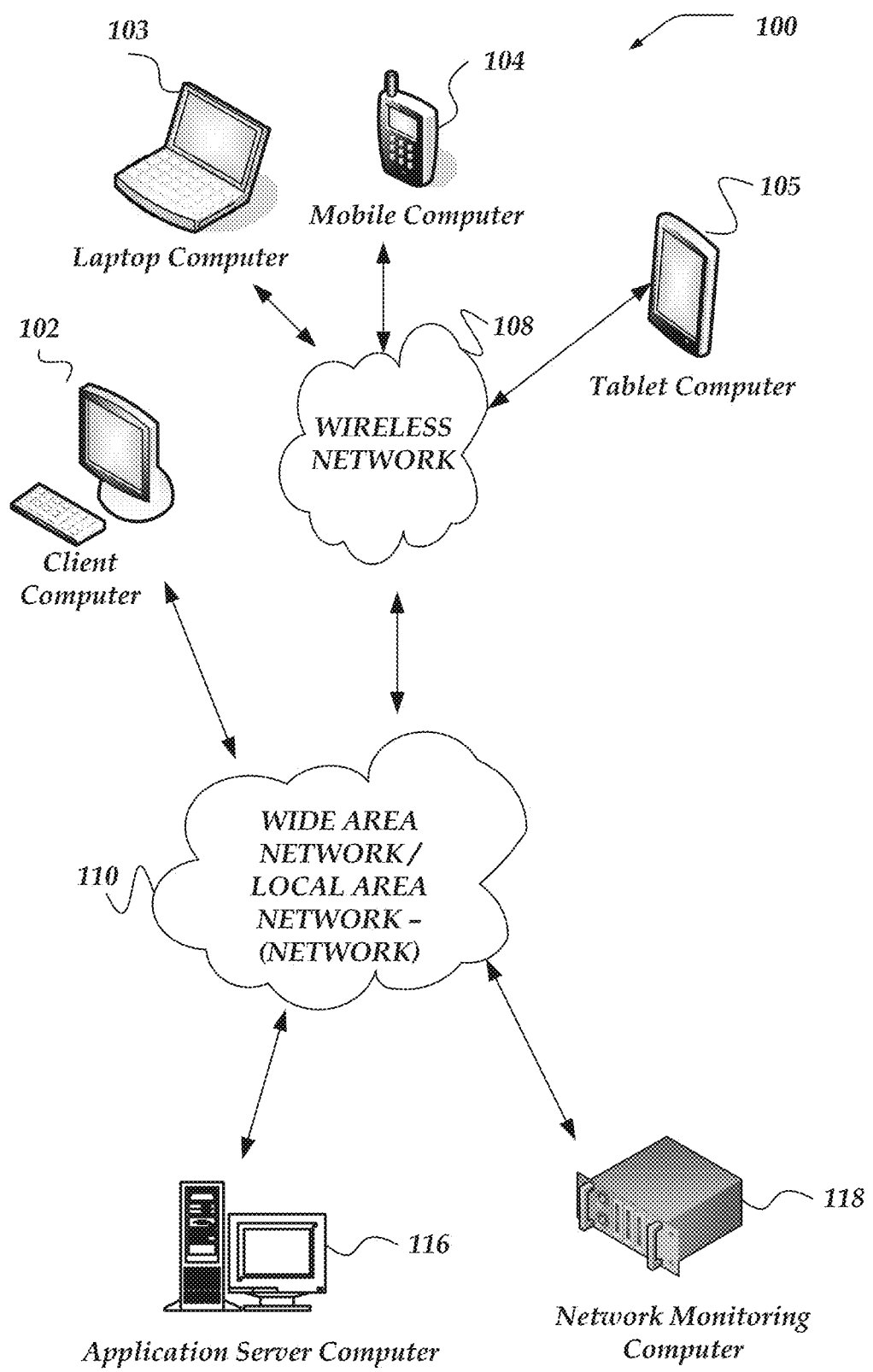
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated the same user, application, client computer, source, destination, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicate data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term, "control traffic" refers to the portion of network traffic that may be associated with control information that may be employed to execute a network communication protocol. Control information may vary depending on the protocols being used or monitored. Typically, control information may include information exchanged between clients and servers to administer or facilitate the operation of network communication protocols, such as, connection initialization, connection termination, resetting connections, status information, sharing secrets, negotiating cipher suites, negotiating transmission characteristics, authentication, acknowledgments, or the like. Generally, control traffic may be required to be exchanged between clients and servers to enable a given protocol to operate or operate efficiently.

As used herein, the term, "data traffic" refers to the portion of network traffic that may be associated with data sent between clients and servers using a given network communication protocol. The data may be information that is carried in a so-called payload portion of a protocol. Data traffic may be considered to be unrelated to the operation or administration of the protocol it used to carry it between endpoints.

As used herein, the terms, "data traffic policy," or "data policy" as used herein refer to network security policy that defines rules or restrictions associated with how particular data traffic may be communicated in a network. Data traffic policies may define rules associated with the direction data traffic may flow for various endpoints, network segments, networks, applications, users, or the like. As described in more detail below, different portions of a network or different entities may be associated with different data traffic policies. Likewise, different protocols may be associated with different data traffic policies.

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the terms "beaconing," "beaconing activity," "beaconing behavior," or "beaconing traffic" refer to network traffic or activity associated with entities (e.g., applications, computers, network devices, peripheral devices, or the like) associated with contacting a remote server/endpoint that may often be associated with the manufacturer, developer, publisher, or distributor of the entities participating in the beaconing activity. Colloquially, beaconing may be referred to as "calling home" because the entities may be attempting to communicate with a server/endpoint operated by a manufacturer, developer, publisher, or distributor of the entities. Beaconing may often be associated with one or more legitimate actions, such as, checking for updates, downloading updates, checking/reporting license status, updating/obtaining licenses, or the like. Many non-malicious applications or devices employ beaconing for a variety of legitimate reasons. Accordingly, in some cases, one or more characteristics of beaconing activity may provide signals/features that may be associated with the entities engaged in the beaconing activity.

In some cases, beaconing may be associated with malicious software that may be trying to contact control servers or exfiltrate sensitive data without authorization.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed monitoring network traffic using one or more network monitoring computers. In one or more of the various embodiments, one or more metrics may be determined based on monitoring network traffic associated with a plurality of entities in the network such that each entity may be associated with a profile that includes the one or more metrics for each entity.

In one or more of the various embodiments, one or more beaconing metrics associated with beaconing activity may be determined based on the one or more metrics such that the beaconing activity may be associated with one or more third parties.

In one or more of the various embodiments, the profile of each entity may be compared with the one or more beaconing metrics to determine one or more entities of the plurality of entities that may be engaged in beaconing activity.

In one or more of the various embodiments, the one or more entities may be characterized based on its beaconing activity such that the beaconing activity includes one or more of communication with one or more endpoints associated with the one or more third parties, employing communication protocols associated with the one or more third-parties, or exchanging payloads consistent with the beaconing activity associated with the one or more third parties.

In one or more of the various embodiments, one or more reports that include information associated with the one or more entities and its beaconing activity may be generated.

In one or more of the various embodiments, determining the one or more beaconing metrics may include determining one or more requests from the one or more entities to one or more target endpoints based on the monitored network traffic such that the one or more target endpoints may be one or more update servers associated with the one or more third parties.

In one or more of the various embodiments, determining the one or more beaconing metrics may include determining one or more requests from the one or more entities to one or more target endpoints based on the monitored network traffic such that the one or more target endpoints may be one or more license servers associated with the one or more third parties.

In one or more of the various embodiments, determining the one or more beaconing metrics may include determining one or more requests from the one or more entities to one or more target endpoints based on the monitored network traffic such that the one or more requests occur at time associated with the one or more third parties.

In one or more of the various embodiments, anomalous beaconing activity may be determined based the one or more beaconing metrics such that the one or more beaconing metrics are associated with one or more of an unexpected update, an unexpected reboot or restart of an entity, an unexpected target endpoint, an unknown application, or an unknown peripheral device.

In one or more of the various embodiments, comparing the profile of each entity with the one or more beaconing metrics may include: determining one or more other beaconing metrics based on other network traffic monitored in one or more other networks; determining other beaconing activity based on the one or more other beaconing metrics; providing another comparison of the profile of each entity with the one or more other beaconing metrics; and in response to determining the one or more profiles to be inconsistent with the other beaconing activity based on the other comparison of the profile of each entity with the one or more other beaconing metrics, performing one or more actions, including: executing one or more rule-based triggers; generating one or more notifications; and updating the one or more reports to include information associated with the other comparison with the one or more other beaconing metrics.

In one or more of the various embodiments, determining the one or more entities of the plurality of entities may include: providing one or more one or more machine learning models that are trained to predict if the one or more metrics are associated with the beaconing activity; generating one or more prediction scores for the one or more entities based on the one or more machine learning models and the one or more metrics; and determining the one or more entities based on one or more prediction scores such that each of the one or more entities may be associated with a prediction score value that exceeds a threshold value.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiments, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
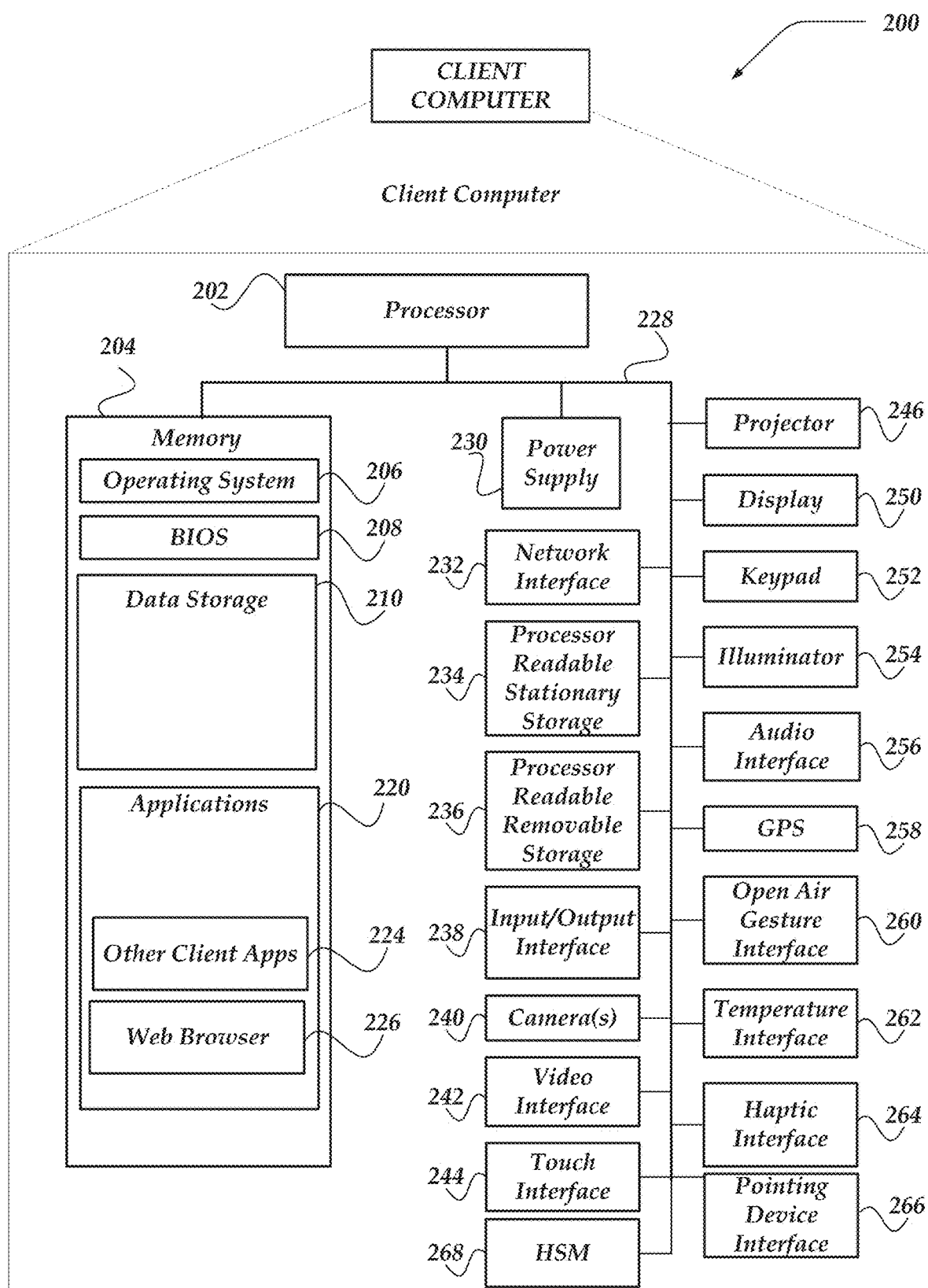
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
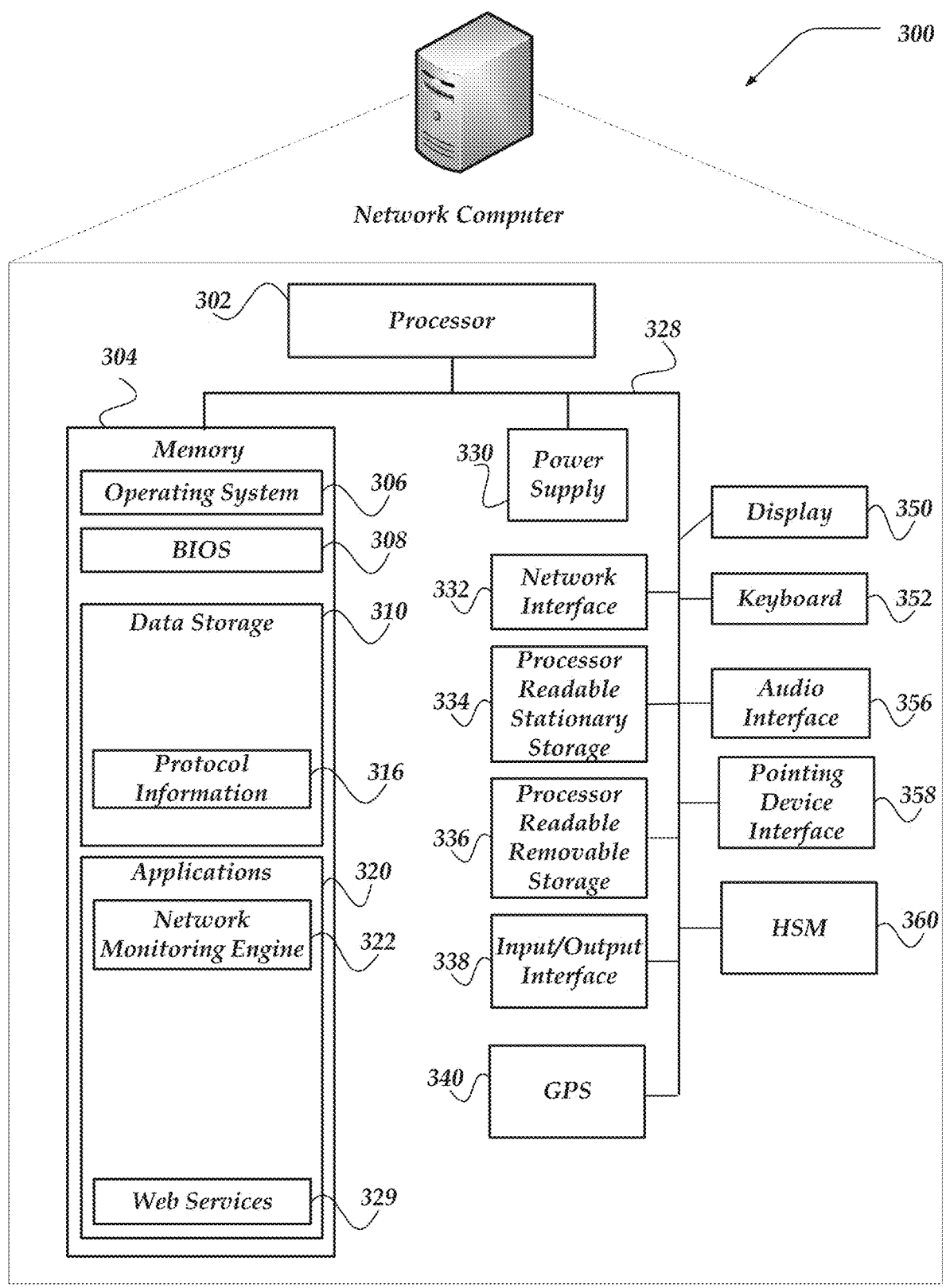
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data.

For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, network topology database 314, protocol information 316, attack models 318, or the like. In some embodiments, network topology database 314 may be a data store that contains information related to the topology of one or more network monitored by a NMC, including one or more device relation models. And, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment. Also, in some embodiments, attack models 318 may store various analytical models that are arranged to infer various characteristics of pending attacks based on network traffic, including network traffic that is associated with one or more honeypot traps.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, web services 329, or the like, may be provisioned and de-commissioned automatically.

Also, in one or more of the various embodiments, network monitoring engine 322, web services 329, or the like, may be located in virtual servers running in a cloud-based computing environment rather than being tied to one or more specific physical network computers. Likewise, in some embodiments, one or more of network monitoring engine 322, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
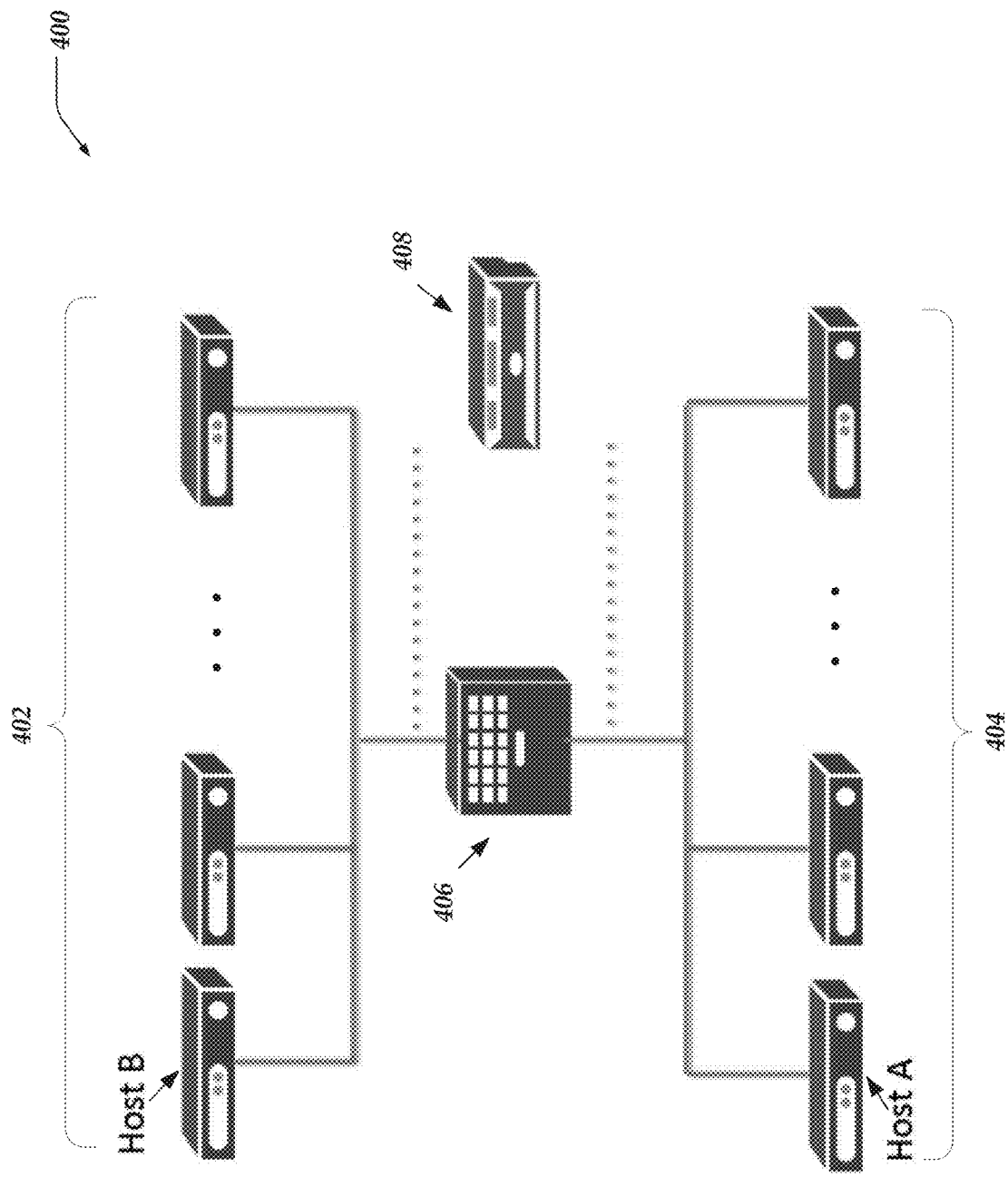
FIG. 4 illustrates a logical architecture of a system for identifying network entities based on beaconing activity in accordance with one or more of the various embodiments.

FIG. 4 illustrates a logical architecture of system 400 for identifying network entities based on beaconing activity in accordance with one or more of the various embodiments. System 400 may be arranged to include a plurality of network devices or network computers on first network 402 and a plurality of network devices or network computers on second network 404. In this example. communication between the first network and the second network is managed by switch 406. Also, NMC 408 may be arranged to passively monitor or record packets (network traffic) that are communicated in network flows between network devices or network computers on first network 402 and second network 404. For example, the communication of flows of packets between the Host B network computer and the Host A network computer are managed by switch 406 and NMC 408 may be passively monitoring or recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs, such as, NMC 408 may be arranged to generate various metrics associated with monitored network traffic. Also, in one or more of the various embodiments, NMCs, such as, NMC 408 may be arranged to analyze some or all of the monitored network traffic to determine metrics or other characteristics associated with applications, services, endpoints, or the like, that may be associated with the monitored network traffic.

Figure 5:
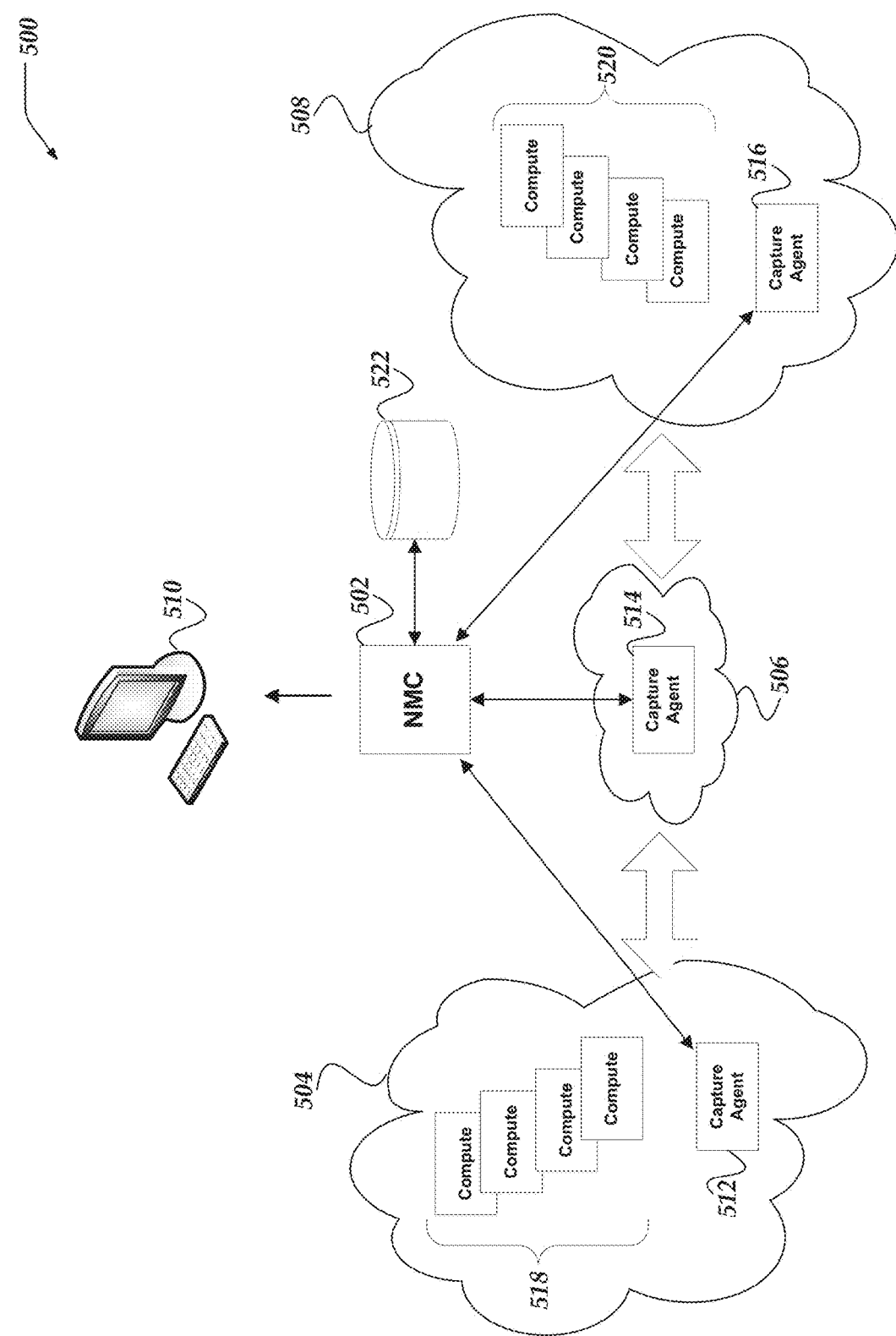
FIG. 5 illustrates a logical schematic of a system for identifying network entities based on beaconing activity in accordance with one or more of the various embodiments.

FIG. 5 illustrates a logical schematic of system 500 for identifying network entities based on beaconing activity in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, co-location computing environments, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that may be distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be to arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522. In one or more of the various embodiments, NMCs may be arranged to employ rules, pattern matching, machine learning models, instructions, parameter settings, threshold/trigger values, or the like, provided via configuration information for monitoring or capturing network traffic.

Figure 6:
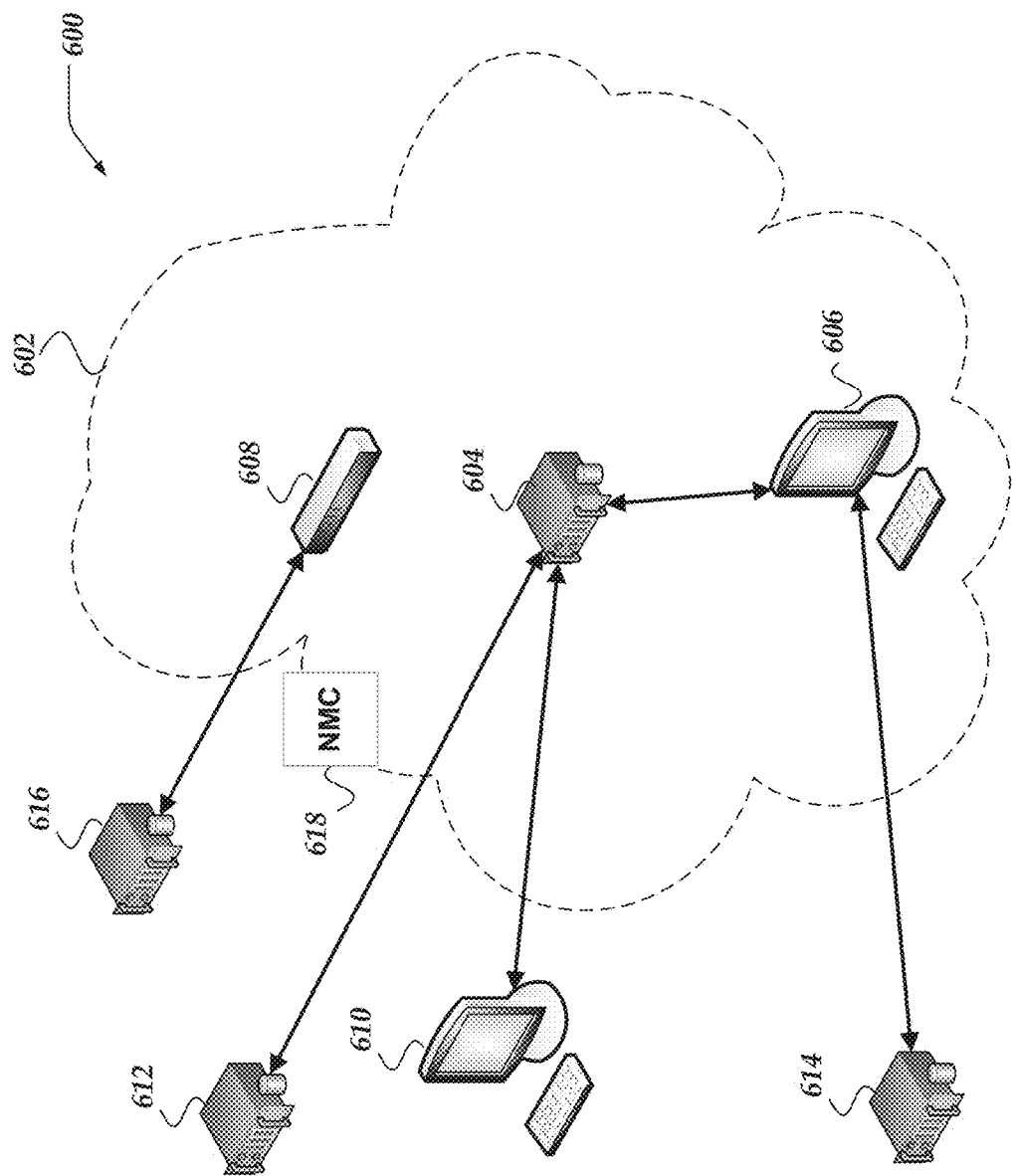
FIG. 6 illustrates a logical schematic of a system for identifying network entities based on beaconing activity in accordance with one or more of the various embodiments.

FIG. 6 illustrates a logical schematic of system 600 for identifying network entities based on beaconing activity in accordance with one or more of the various embodiments. In one or more of the various embodiments, system 600 may represent a networking environment that may include: one or more networks, such as, network 602; one or more network computers, such as, server 604; one or more client computers, such as, client computer 606, one or more network devices/appliances, such as, network device 608, one or more NMCs, such as, NMC 618; or the like.

Further, in this example, for some embodiments, one or more computers may be considered external to system 600. In this example, client computer 610, network computer 612, network computer 614, network computer 616, or the like, may be considered computers that may be interact with system 600 even though they may be outside of the network 602.

In some networking environments, computers, such as, network server 604, or the like, may host one or more applications, hardware peripherals, or the like, that may provide various services to other services or computers that may be considered inside network 602. For example, in some embodiments, network server 604 may host a web server that user of client computer 606 may access to view or interact with web hosted applications, web sites, or the like.

Further, in some embodiments, one or more services considered to be inside or part of network 602 may provide applications, hardware peripherals, or the like, that may provide one or more services to one or more user/computers that may be consider outside network 602. For example, in some embodiments, network server 604 may host a web server that provide web applications or web sites that users of client computer 610 may access.

Also, in some embodiments, networking environments, such as, system 600 may include one or more network devices, such as, network device 608. In some embodiments, network device 608 may be considered to represent one or more network devices, such as, switches, routers, firewalls, or the like, that may be part of the networking environments.

In one or more of the various embodiments, as described above, NMC 618 may be arranged to monitor network traffic that occurs inside network 602 as well as network traffic that enters or exits network 602. Also, for some embodiments NMC 618 may represent one or more NMC device, one or more NMC services, or the like, that may support one or more observation ports. Accordingly, in this example, NMC 618 is illustrated as being on the edge of network 602 because it is assumed to be configured to monitor network traffic that may enter or exit network 602 as well as network traffic that occurs inside network 602. Also, one of ordinary skill in the art will appreciate that system 600 may include one or more devices/services (not shown) that may forward portions of the network traffic associated with network 602 to NMC 618.

Further, for brevity and clarity, various devices, computers, applications, services, included in system 600 or associated with system 600 may be referred to herein as entities or network entities. Network entities may be considered devices, computers, applications, services, or the like, that may be associated with portions of the network traffic in system 600. Typically, but not always, entities may be associated with distinguishable network addresses (tuples) or endpoints. In some cases, more than one entity may share the same endpoint. Also, in some embodiments, some entities may be considered ephemeral, such as, compute instances in cloud computing environments that may be provisioned or released depending on local circumstances.

In one or more of the various embodiments, one or more entities operating in network 602 may communicate with one or more internal entities (e.g., client computer 606) or external entities (e.g., client computer 610) as a normal course of their operation. However, in some embodiments, some or all of the network traffic associated with one or more entities may be encrypted or otherwise opaque to NMC 618. Accordingly, in some embodiments, NMC 618 may have more or less visibility to network traffic associated with entities depending on the encryption protocol or communication protocol being used being employed by individual entities. For example, in one or more of the various embodiments, some internal network traffic, such as, administrative traffic (e.g., DHCP traffic) may be visible to completely visible to NMC 618 while encrypted traffic between network server 604 and client computer 606 may be obscured.

In some cases, one or more entities may be provided or supported by third party vendors, or the like. Accordingly, in some cases, one or more entities may communicate with an endpoint or entity associated with their vendor to obtain software updates, firmware updates, or the like. Likewise, in some cases, one or more entities may be arranged to rely on remote entities to support license validation, license renewal, digital rights management, or the like. Thus, in some embodiments, one or more entities inside monitored networks may provide network traffic to communicate with one or more endpoints that are outside of a monitored network.

In this example, for some embodiments, one or more entities associated with network server 604 may be arranged to communicate with network computer 612 for various reasons, such as, obtaining updates, exchanging license information. Likewise, for some embodiments, devices, such as, device 608 may be arranged to automatically obtain updates or license information from servers, such as, network computer 616. Further, in this example, entities associated with client computer 606 may be arranged to communicate with network computer 614 to obtain update information or license information.

Further, in some embodiments, one or more entities in network 602 may be arranged to regularly send other information that may be associated with various actions/operations, such as, restarts, user/client counts, activity logs, error/crash logs, bug reports, system changes, log messages, or the like.

One of ordinary skill in the art will appreciate that while entities may be expected or known to communicate with various entities such as update servers or license servers for one or more well-known or expected reasons, this does not always have to be the case. Accordingly, for brevity and clarity, herein the term beaconing may be employed to refer to communications associated with updates, license management, logging, or the like. Thus, herein the term beaconing may be considered to refer to automatic/periodic communication an entity may make to servers that may be separate or outside of the monitored network. Colloquially, beaconing may be referred to as "phoning-home" representing the actions associated with an entity that automatically communicates a server associated with its manufacturer, distributor, or the like. Also, in some cases, beaconing may be associated with malicious activity, such as, malware communicating with a command and control server. One of ordinary skill in the art will appreciate that as used herein, the term beaconing may refer to legitimate/authorized communications as well as malicious/unauthorized communication.

In one or more of the various embodiments, NMCs may be arranged to generate entity profiles for some or all of the entities that may be discovered in monitored networks. Accordingly, in some embodiments, the entity profiles may be employed to evaluate or characterize the various entities. For example, for some embodiments, NMCs may be arranged to compare network metrics for similar entities such to determine one or more entities may be operating significantly different than their peer entities. Likewise, in some embodiments, NMCs may be arranged to employ one or more machine-learning classifiers, heuristics, or the like, to identify entities that may be problematic based on the entity profiles.

In some embodiments, various entities may provide configuration features that enable administrators to enable or restrict the types or amount beaconing. Accordingly, in some embodiments, one or more entities may be associated with acceptable/familiar amount beaconing. Thus, in some embodiments, NMCs may be arranged to monitor if beaconing behavior for an entity remains consistent with its configuration.

In one or more of the various embodiments, NMCs may have access to beaconing profile information for more than one network or network operator. For example, in some embodiments, NMCs may be provided by a monitoring organization that provides network monitoring for more than one organization. Accordingly, in some embodiments, NMCs may be configured to compare beaconing activity across a community of organizations. For example, in some embodiments, if a particular make/model of a smart switch is used by several community members (e.g., different organizations), NMCs may be arranged to compare beaconing activity (metrics) for the smart switch across the different organizations. Accordingly, in this example, NMCs may flag outliers based on unusual beaconing metrics. Likewise, for example, NMCs may confirm that one or more entities are exhibiting normal beaconing behavior based on evaluating beaconing metrics of other organizations.

Further, in some embodiments, NMCs, such as, NMC 618 may be arranged to identify unknown/unexpected entities that may be associated with network traffic in monitored networks. In some cases, for some embodiments, one or more entities in a monitored network may not be fully recognized by a NMC. For example, an NMC may be added to a system to discover the entities that may be operating in the monitored networks. Accordingly, in some embodiments, NMCs may apply beaconing metrics as part of the process to identify entities. For example, in some embodiments, if a particular application is known to employ one or more well-known license servers, the NMC may infer the type of an otherwise unknown application based on observing it perform license validation with the well-known license servers.

Likewise, in some embodiments, one or more applications or devices may be known to have a particular cadence of beaconing behavior. For example, database server A device may validate its license every 12 hours by contacting one or more well-known license servers. Thus, in some embodiments, NMCs may be arranged to compare beaconing behavior cadence to help infer the identity of entities.

In some cases, for some embodiments, NMCs may be enabled to passively monitor at least one or more portions of the network traffic associated with beaconing behavior and compare it against known or expected patterns, protocols, or the like. In some cases, if portions of the content may be obscured because of encryption, or the like, NMCs may collect one or more beaconing metrics, such as, timing/cadence of beaconing behavior, size of downloads, shape of the traffic associated with beaconing behavior, or the like, to generate a entity profile that may be employed to help identify entities based on beaconing behavior.

In one or more of the various embodiments, NMCs may be arranged to employ beaconing metrics to identify threats, unauthorized activity, malicious activity, or the like. In some embodiments, NMCs may be arranged to identify the use of unauthorized applications by users based on beaconing behavior. For example, if a user installs an unauthorized application on client computer 606, the unauthorized application may be detected based on its beaconing activity. Thus, in some cases, even if the network traffic associated with the unauthorized application is encrypted or otherwise obscured, NMCs may be arranged to detect the unauthorized application based on observing beaconing traffic that reaches out to a well-known server/endpoint that may be associated with the unauthorized application.

Also, in one or more of the various embodiments, NMCs may be arranged to detect patterns associated with user installing, updating, or downgrading applications. For example, NMCs may be arranged to detect if a server may have been rebooted based on observing network traffic associated with rebooting the server, such as, network handshaking (e.g., DHCP traffic), key exchanges, service locating traffic, or the like, that may be well-known to be associated with startup processes for various entities. For example, at reboot or initial login, some Linux distributions automatically check one or more well-known repositories to report if there may be packages that could be upgraded. Accordingly, in this example, NMCs may be arranged to infer which Linux distributions may be running based on this type of beaconing behavior.

Likewise, in some embodiments, users may trigger updates for applications, operating systems, peripherals, or the like. Accordingly, in some embodiments, NMCs may be arranged to detect the beaconing traffic to determine that the update may be occurring. In some embodiments, NMCs may be arranged to gather various information about the updates depending on the visibility of the content of the beaconing traffic. In some cases, NMCs may be arranged to determine make, model, manufacturer, version, or the like, based on the beaconing traffic. For example, in some embodiments, if a user installs a web camera that automatically downloads a driver or updates, an NMC may be enabled to identify the device type (e.g., camera), make, model, or the like, depending on the beaconing traffic that is observed. Thus, in this example, users that install restricted or prohibited devices (or applications) may be detected and flagged based on beaconing behavior observed by NMCs.

Further, in some embodiments, evaluating and recognizing beaconing traffic may enable NMCs to distinguish conventional network traffic from beaconing traffic. For example, in some embodiments, it may be unexpected for one or more entities to communicate with client computers, such as, client computer 610, that may be outside of the monitored network. However, in some cases, the one or more entities may be authorized or expected to exchange beaconing traffic with one or more servers, such as, network computer 612. Accordingly, in this example, for some embodiments, NMCs may be configured to flag network traffic exchange between server 604 and client computer 610 as being suspicious. In contrast, for example, NMCs may be configured to consider beaconing traffic between server 604 and network computer 612 as of no concern.

In some cases, beaconing traffic and conventional traffic may be exchanged with the same endpoint. For example, in some embodiments, a user may be browsing a website using a web browser to interact with a vendor's server. While, in this example, other entities in the monitored network traffic may be exchanging beaconing traffic with the same external endpoint. Accordingly, in some embodiments, NMCs may be arranged to distinguish the beaconing traffic from user traffic based on one or more characteristics of the web browser (e.g., user-agent, network port, or the like) that may be visible to the NMC.

Note, one of ordinary skill in the art will appreciate that real-world production/operational networking environments may include more or fewer computers, devices, applications, or the like, than illustrated herein. However, the description and illustration of system 600 is at least sufficient to disclose the innovations described herein to one of ordinary skill in the art. Likewise, for brevity and clarity other networking details, such as, sub-networks, interconnections, or the like, are omitted.

Further, one of ordinary skill in the art will appreciate that while system 600 may appear to be illustrating physical hardware/computers, the scope of the innovations described herein contemplate virtualization, cloud computing environments, containerized services, micro-services, server-less services, or the like, or combination thereof.

Further, in some embodiments, NMCs may be arranged to employ various rules, instructions, patterns, conditions, or the like, provided via configuration information to determine responses to different types of beaconing behavior. In some embodiments, NMCs may be arranged to progressively generate/populate entity profiles based on the beaconing metrics. Likewise, in some embodiments, NMCs may be arranged to apply one or more rules, heuristics, or the like, to generate reports, notifications, or the like, associated with observed beaconing traffic.

Figure 7:
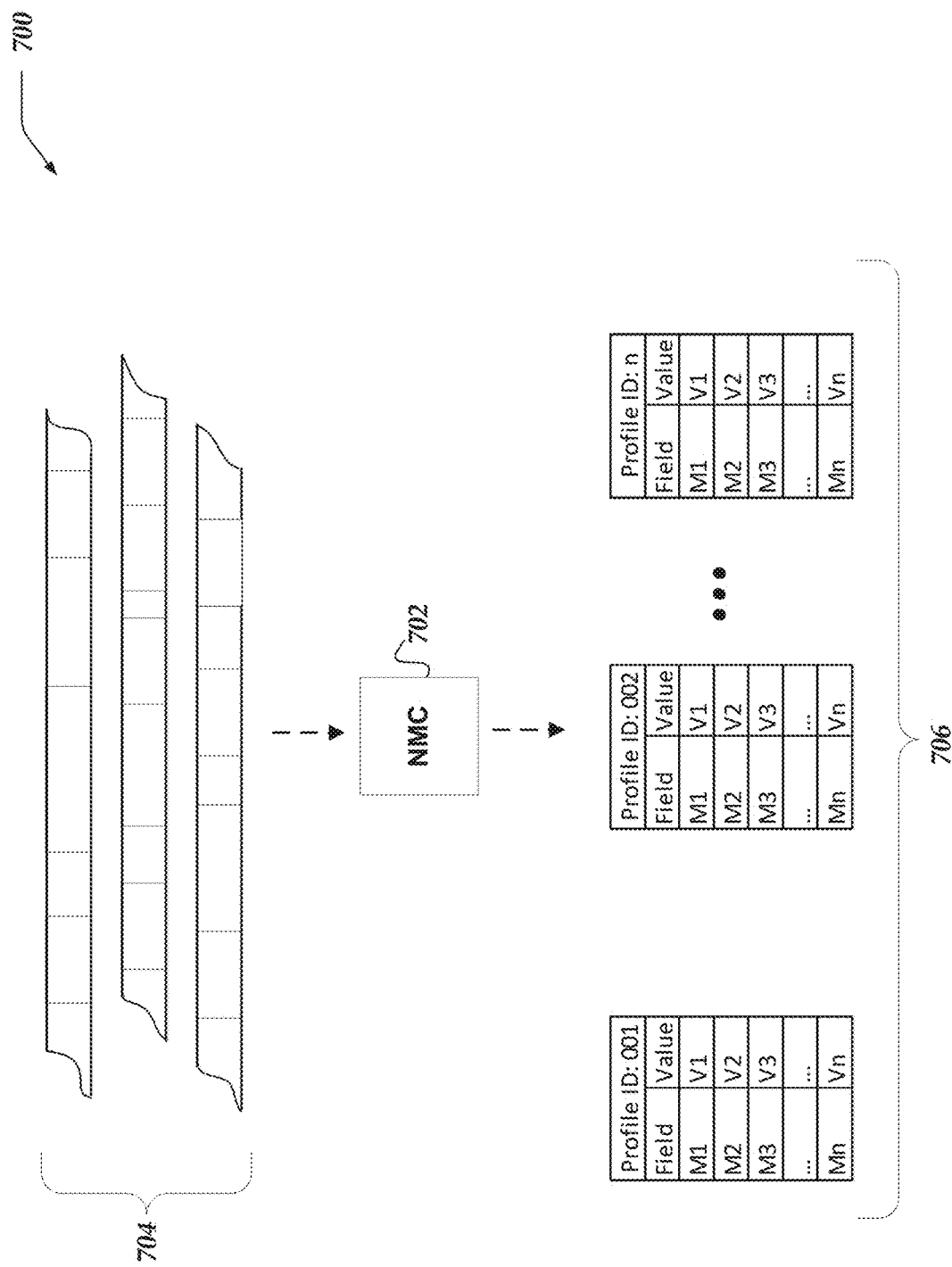
FIG. 7 represents a logical representation of a system for transforming monitored network traffic including beaconing traffic into profile objects in accordance with one or more of the various embodiments.

FIG. 7 represents a logical representation of system 700 for transforming monitored network traffic including beaconing traffic into profile objects in accordance with one or more of the various embodiments. In one or more of the various embodiments, NMC 702 may be arranged to passively monitor network traffic 704. As described, in some embodiments, NMC 702 may be arranged to provide various metrics associated with monitored network traffic 704. In some cases, network traffic 704 may include beaconing traffic associated with various beaconing behavior of entities in the monitored networks.

In one or more of the various embodiments, an NMC may be arranged to transform one or more collected metrics into profile objects suitable for classifying entities based on beaconing behavior.

Accordingly, in one or more of the various embodiments, as described above, NMCs such as, NMC 702 may be arranged to collect metrics from monitored network traffic and arrange them into entity profiles. In one or more of the various embodiments, profile objects, such as, profile 706 may include one or more collections of fields with values that may be based on network traffic 704. In one or more of the various embodiments, one or more of the metrics included in a profile object may correspond to beaconing metrics collected by the NMC. In other embodiments, one or more of the metrics included in a profile object may be composites based on two or more metrics.

Further, in one or more of the various embodiments, metric values included in profile objects may be normalized to a common schema as well as arithmetically normalized. Normalizing metric values to a common schema may include bucketing values. For example, in some embodiments, observed metrics that have continuous values may be mapped to named buckets, such as high, medium, low, or the like. Likewise, one or more metrics may be categorized based on one or more rules or heuristics.

Accordingly, in some embodiments, NMCs may be arranged to employ profile objects to represent different entities that may be discovered or observed in monitored networks. Thus, in some embodiments, NMCs may be arranged to include one or more beaconing metrics in profile objects to provide additional signals or characteristics that may be employed to infer information about the corresponding entities in the monitored network.

Generalized Operations

FIGS. 8-12 represent generalized operations for identifying network entities based on beaconing activity in accordance with one or more of the various embodiments. In one or more of the various embodiments, processes 800, 900, 1000, 1100, and 1200 described in conjunction with FIGS. 8-12 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 8-12 may be used for identifying network entities based on beaconing activity in accordance with at least one of the various embodiments or architectures such as those described in conjunction with FIGS. 4-7. Further, in one or more of the various embodiments, some or all of the actions performed by processes 800, 900, 1000, 1100, and 1200 may be executed in part by network monitoring engine 322, or the like, running on one or more processors of one or more network computers.

Figure 8:
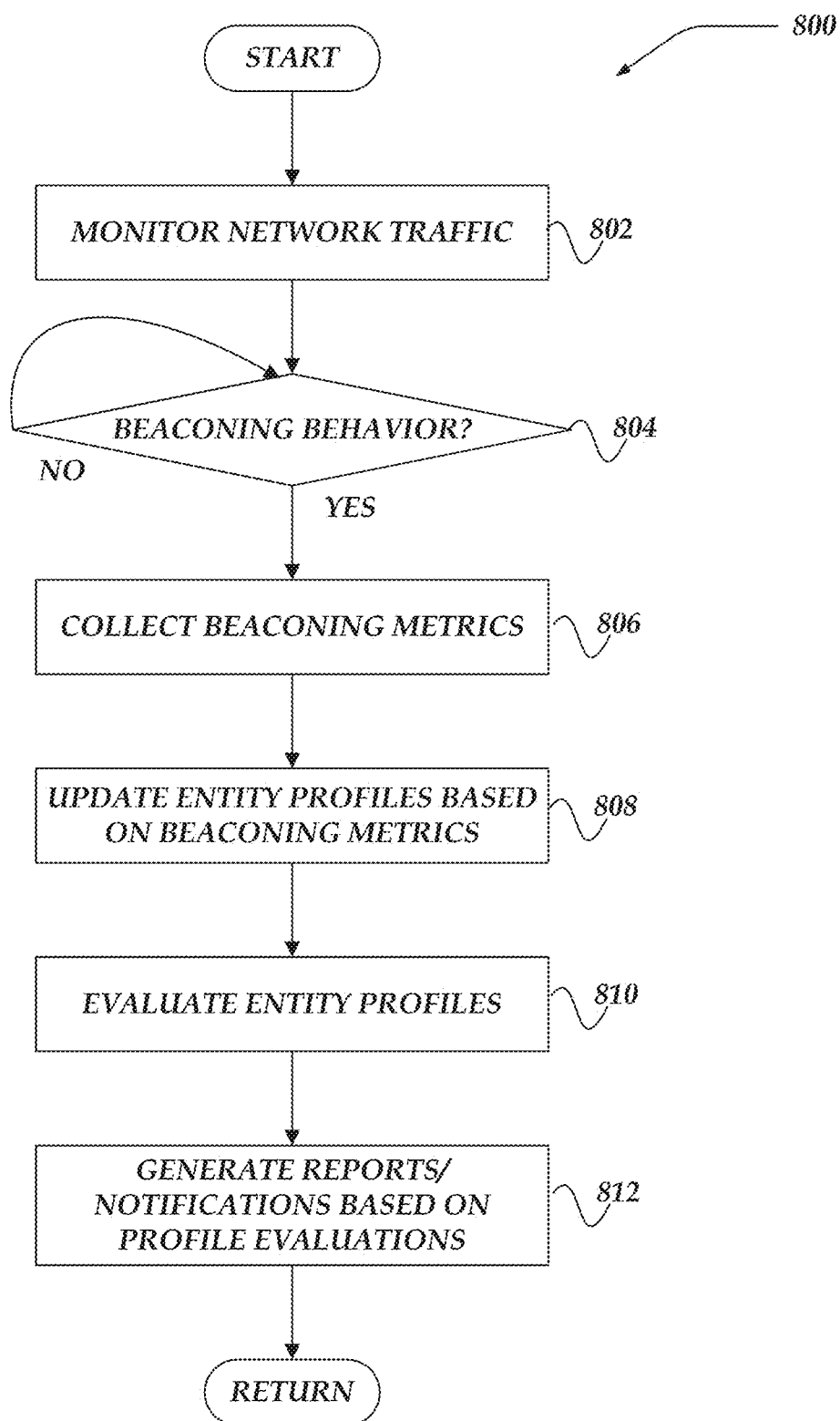
FIG. 8 illustrates an overview flowchart of a process for identifying network entities based on beaconing activity in accordance with one or more of the various embodiments.

FIG. 8 illustrates an overview flowchart of process 800 for identifying network entities based on beaconing activity in accordance with one or more of the various embodiments. After a start block, at block 802, in one or more of the various embodiments, NMCs may be arranged to monitor network traffic associated with one or more endpoints in one or more networks. As described above, NMCs may be arranged to monitor network traffic in a network environment. Accordingly, in some embodiments, NMCs may collect a variety of metrics associated with the one or more flows that comprise network traffic in monitored networks. Further, in some embodiments, NMCs may be arranged to analyze patterns, features, contents, or the like, of network traffic associated with one or more network flows. In some embodiments, NMCs may be arranged to track requests/responses between endpoints to determine the protocols that may be in use or evaluate if the network traffic matches expectation or policies that may be associated protocols. Note, as mentioned above protocols detected or monitored by NMCs may be one or more of data-link layer protocols, transport protocols, application protocols, or the like. Accordingly, for brevity or clarity they may be referred to herein as protocols.

In some embodiments, NMCs may be arranged to identify one or more patterns, protocols, traffic features, or the like, that may be associated with beaconing behavior of one or more entities in the monitored network.

At decision block 804, in one or more of the various embodiments, if the monitored network traffic or one or more associated endpoints may be associated with beaconing behavior, control may flow block 806; otherwise, control may loop back to block 802.

In one or more of the various embodiments, beaconing activity may be classified into general categories, such as, update activity, license activity, or the like. Accordingly, in some embodiments, NMCs may be arranged to employ one or more rules, models, instructions, or the like, provided via configuration information to evaluate network traffic to determine if the network traffic may be associated with beaconing activity.

At block 806, in one or more of the various embodiments, NMCs may be arranged to collect one or more beaconing metrics associated with the one or more entities that may be associated with the beaconing behavior. In one or more of the various embodiments, NMCs may be arranged to collect one or more metrics that may be common to network traffic, such as, source information, destination information, latency, protocol information, encryption information, or the like. Also, in some embodiments, NMCs may be arranged to collect one or more metrics that may be specific to different types of beaconing activity. Further, in some embodiments, NMCs may be configured to collect one or more metrics associated with beaconing activity that may be specific to one or more vendors, one or more applications, one or more services, one or more peripherals, operation systems, or the like.

At block 808, in one or more of the various embodiments, NMCs may be arranged to update entity profiles that may be associated with the one or more entities associated with the beaconing behavior.

In one or more of the various embodiments, as described above, entity profiles may be associated with entities in the monitored network. Also, in some embodiments, entity profiles may be associated with one or more network flows, connections, network addresses, or the like.

At block 810, in one or more of the various embodiments, NMCs may be arranged to evaluate the one or more entity profiles based on at least the beaconing metrics. In one or more of the various embodiments, NMCs may be arranged to employ various machine learning models/classifiers, one or more heuristics, conditions, or the like, for evaluating beaconing activity that may be associated with an entity. In some embodiments, NMCs may be arranged to identify anomalous beaconing activity based on determining one or more entity profiles that include one or more metric values that may be associated with anomalous beaconing activity.

At block 812, in one or more of the various embodiments, NMCs may be arranged to generate one or more reports/notifications based on the evaluation of the entity profiles. In some embodiments, NMCs may be arranged to include beaconing activity information in one or more reports, including, dashboard user interfaces, visualizations, documents, log files, event streams, or the like. In some embodiments, reports may include writing records (e.g., events, notifications, log records, or the like) into databases or other data stores. Accordingly, in some embodiments, other services or applications may be provided the reported information. Thus, in some embodiments, the other services or applications may be configured to take further action in response to the reported beaconing activity. For example, in some embodiments, the reports may include information based on characterizing one or more entities based on beaconing activity.

Next, in one or more of the various embodiments, control may be returned to a calling process.

Figure 9:
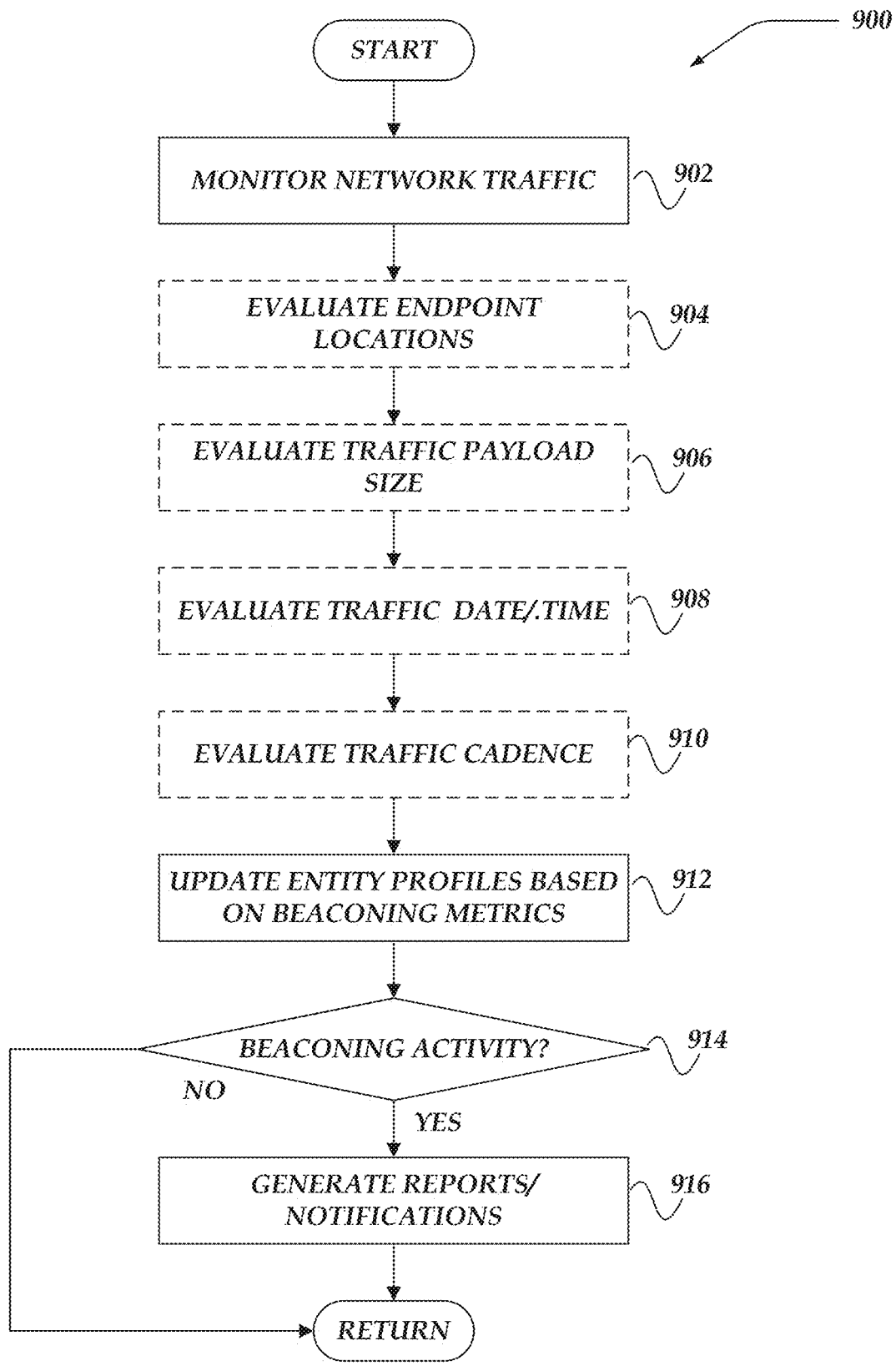
FIG. 9 illustrates a flowchart of a process for identifying network entities based on beaconing activity in accordance with one or more of the various embodiments.

FIG. 9 illustrates a flowchart of process 900 for identifying network entities based on beaconing activity in accordance with one or more of the various embodiments. After a start block, at block 902, in one or more of the various embodiments, NMCs may be arranged to monitor network traffic associated with one or more entities in one or more monitored networks. As described above, NMCs may be arranged to monitor network traffic in one or more monitored networks. Likewise, as described above, NMCs may be arranged to monitor network traffic existing or arriving to the one or more monitored networks.

At block 904, in one or more of the various embodiments, optionally, NMCs may be arranged to evaluate endpoints associated with the network traffic.

In one or more of the various embodiments, NMCs may be arranged to collect metrics associated with one or more endpoints that may be sources of monitored network traffic or one or more endpoints that may be targets (or receivers) of network traffic. In one or more of the various embodiments, each endpoint may be associated with tuple information, including network addresses, ports, VLAN identifiers, or the like.

Accordingly, in some embodiments, NMCs may be arranged to collect a list of endpoints that may exchange network traffic with one or more entities in the monitored networks. In one or more of the various embodiments, NMCs may be configured to employ one or more filters, masks, or the like, to define/determine which endpoints to monitor or which endpoints to exclude.

At block 906, in one or more of the various embodiments, optionally, NMCs may be arranged to evaluate payload sizes associated with the network traffic. In one or more of the various embodiments, NMCs may be arranged to collect one or more metrics associated with the size payloads that may be associated with monitored network traffic. In one or more of the various embodiments, NMCs may be configured to collect various metrics, such as, request-response payload sizes, payload titles/labels (e.g., file names), or the like.

At block 908, in one or more of the various embodiments, optionally, NMCs may be arranged to evaluate the date/time information that may be associated with the network traffic. In one or more of the various embodiments, beaconing activity for one or more vendors or manufacturers may occur at certain defined times. For example, in some embodiments, a third party application may be configured to regularly check a 'home' server for available updates. Accordingly, for example, NMCs may be arranged to track if network traffic between a server computer in the monitored network and one or more external endpoints occurs.

At block 910, in one or more of the various embodiments, optionally, NMCs may be arranged to evaluate the cadence of the network traffic. In one or more of the various embodiments, cadence metrics may include metric information associated with patterns associated with the timing of communication with one or more endpoints. In some embodiments, cadence metrics may include tracking metrics associated with requests and responses. In some cases, this may include tracking metrics associated with the amount of information for traffic associated with requests and pairing it with metrics associated with the amount of information provided in responses. Likewise, in one or more of the various embodiments, this may include tracking metrics associated with the timing of traffic associated with requests and pairing it with metrics associated with the timing information provided in responses.

At block 912, in one or more of the various embodiments, NMCs may be arranged to update entity profiles associated with entities that may be associated with the network traffic. As described above, in some embodiments, NMCs may be arranged to maintain one or more entity profiles that may be employed to associate one or more metrics with individual entities. In some cases, for some embodiments, entity profiles may employ to track classes or types of entities, applications, services, or the like.

In one or more of the various embodiments, one or more portions of entity profiles may be considered to be similar to feature vectors, or the like, that may be used with Machine Learning models for classifying entities. Also, in some embodiments, entity profiles may include (or reference) time-series information associated with entities.

In one or more of the various embodiments, NMCs may be arranged to create one or more entity profiles before the associate entities may be identified. For example, an initial entity profile may include a source endpoint and a target endpoint. But, for example, as more metrics are collected or determined to be associated with the entities, additional fields or records may be added to the corresponding entity profile.

In one or more of the various embodiments, one or more fields or records in entity profiles may be employed exclusively for metrics associated with beaconing. Also, in some embodiments, one or more fields or records in entity profiles may be for storing metrics common to identifying other features or characteristics of entities in monitored networks.

As more metrics are determined, in one or more of the various embodiments, entity profiles may be progressively updated to include more fields, reference information, or the like. Accordingly, in some embodiments, NMCs may be arranged to employ entity profiles as develop activity fingerprints for entities in the monitored networks.

At decision block 914, in one or more of the various embodiments, if the network traffic may be associated with beaconing activity, control may flow to block 916; otherwise, control may be returned to a calling process. As described above, in some embodiments, beaconing activity may be associated with particular metrics or metric patterns. Accordingly, in one or more of the various embodiments, entity profiles associated with entities may be evaluated to determine or infer if entities may be involved with beaconing activity.

In one or more of the various embodiments, NMCs may be arranged to employ entity profiles with Machine Learning models, heuristics, pattern matching, conditions, or the like, to determine if an entity may be performing beaconing activity. For example, for some embodiments, entities associated with entity profiles that show regular communication with one or more well-known beaconing targets, such as, update servers, license servers, package repositories, or the like, may be considered to be performing beaconing activity.

In one or more of the various embodiments, one or more machine learning models that are trained to predict if one or more metrics determined from network monitoring may be associated with the beaconing activity may be provided to NMCs.

Accordingly, in one or more of the various embodiments, NMCs may be arranged to employ the one or more the machine learning models to generate one or more prediction scores for the one or more entities based on the one or more machine learning models and the one or more metrics or one or more entity profiles. Thus, in some embodiments, the one or more entities associated with beaconing activity may be determined based on one or more prediction scores such that the entities that may be associated with a prediction score value that exceeds a threshold value may be determined to be associated with beaconing activity.

Also, in some embodiments, NMCs may be arranged to employ models, rules, patterns, threshold values, or the like, provided via configuration information to identify beaconing information based on entity profiles or other collected metrics. For example, as new or different beaconing activity becomes of interest, NMCs may be updated with machine learning models, heuristics, patterns, or the like, that may enable NMCs to identify the new or different beaconing activity based on entity profiles or other metrics.

At block 916, in one or more of the various embodiments, NMCs may be arranged to generate reports or notifications associated with the beaconing activity (if any).

As described, in one or more of the various embodiments, NMCs may be arranged to infer a variety of information to characterize entities in monitored networks based on the beaconing activity. For example, in some embodiments, NMCs may be arranged to evaluate features associated with update files (e.g., update server, file size, file name, file contents, or the like) to infer the make or model of a network device that may be involved beaconing activity.

Similar to detecting beaconing activity, in some embodiments, NMCs may be arranged to employ models, rules, patterns, threshold values, or the like, provided via configuration information to determine the information to include in reports or the notifications to generate if beaconing activity may be identified.

In some embodiments, NMCs may be arranged to determine if an entity may be exhibiting anomalous behavior, if it performs unexpected or inconsistent beaconing activity. For example, in some embodiments, NMCs may be arranged to determine if an entity may be communicating with an update server that may be inconsistent with other information known about the entity. For example, if a network computer appears to be receiving updates from an update server that is not associated with applications, peripherals, or the like, known or authorized to be installed on the network computer, NMCs may be arranged to generate a notification associated with the anomalous updates.

Next, in one or more of the various embodiments, control may be returned to a calling process.

Figure 10:
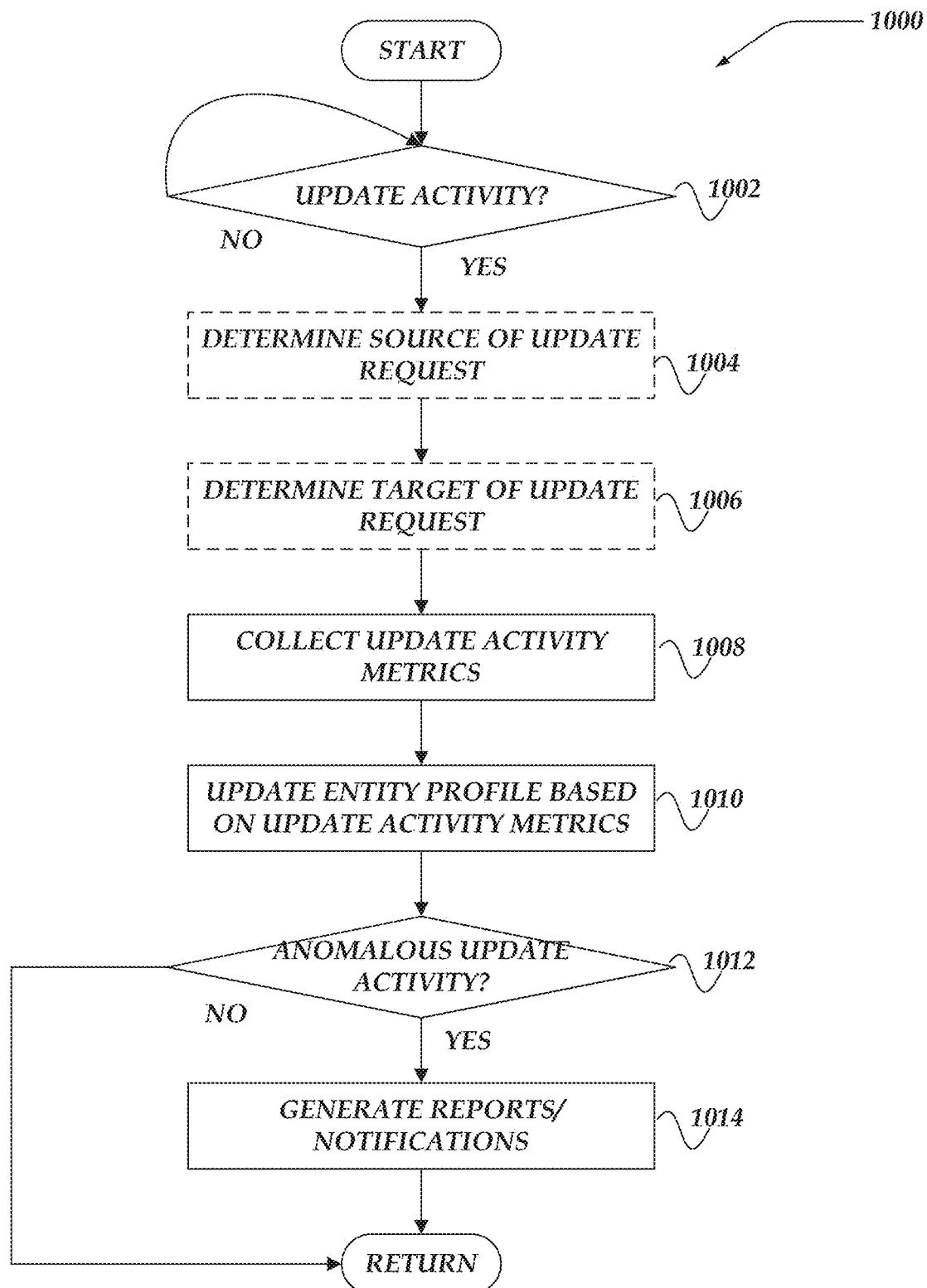
FIG. 10 illustrates a flowchart of a process for identifying network entities based on beaconing activity in accordance with one or more of the various embodiments.

FIG. 10 illustrates a flowchart of process 1000 for identifying network entities based on beaconing activity in accordance with one or more of the various embodiments. After a start block, at decision block 1002, in one or more of the various embodiments, if NMCs observe update activity associated with one or more entities in the monitored network, control may flow to block 1004; otherwise, control may loop back to decision block 1002. As described above, NMCs may be arranged to monitor network traffic to determine if update activity may be occurring.

At block 1004, in one or more of the various embodiments, optionally, NMCs may be arranged to determine the source of the update traffic. In one or more of the various embodiments, NMCs may be arranged to determine the one or more entities in monitored networks that may be sending update requests or otherwise initiating the update activity.

In one or more of the various embodiments, NMCs may be arranged to determine the entities making update requests based on observing the tuple information associated with the outbound network traffic that may be associated with the update activity.

In some embodiments, the initiation of update activity may not be immediately recognized as update activity. Accordingly, in some embodiments, NMCs may be arranged to infer that one or more entities may be sending update activity requests after a sufficient amount of evidence has been accumulated. In some embodiments, the amount or type of evidence may vary depending on type of entity, the type of update activity, or the like. For example, if an entity is observed sending a request to a well-known update server, NMCs may be configured to infer that the source of the request may be initiating update activity. In other cases, in some embodiments, NMCs may be configured to infer that an entity is involved with update activity after observing a particular handshake between the source of the update request and the update server. For example, in some embodiments, applications may employ libraries or components that employ a recognizable application protocol for updates. Thus, in some embodiments, if NMCs confirm that the update application protocol is being used, the source of the update request (as well as the update server) may be confirmed or inferred. Note, in some cases, vendors of different applications may embed the same third-party installers/updaters. Accordingly, in some cases, NMCs may be configured to recognize the application protocols used by the third-party installers/updaters if they may be used by different applications or services.

Note, this block is indicated as being optional because in some embodiments, some of the actions to determine the sources of update requests may have been determined by process 900. Accordingly, in some embodiments, process 1000 may be provided some or all of information for identifying sources of the update requests in the form of, tuple information, MAC addresses, hostnames, or the like, from other processes such as process 900.

At block 1006, in one or more of the various embodiments, optionally, NMCs may be arranged to determine a target endpoint that may be associated with the update traffic. In some embodiments, update activity may be directed to one or more servers or endpoints that may provide updates or update information for the entity engaging in update activity. In some embodiments, NMCs may be configured to employ a list or database of update servers for various software or hardware manufacturers. Accordingly, in some cases, NMCs may be arranged to confirm that the update requests may be provided to known update servers. In contrast, in some embodiments, NMCs may be arranged to recognize update requests being sent to unknown or unauthorized servers and flag the related network traffic as suspicious network traffic that may require further analysis.

In one or more of the various embodiments, NMCs may be arranged to progressively generate a list or database of update servers based on update activity associated with entities in other networks or other organizations. For example, in some embodiments, NMCs deployed in other networks for different organizations may have previously identified or validated one or more update servers. Accordingly, in some embodiments, NMCs may be arranged to collect some or all of the information associated with the validated update servers in a common database that may be shared or accessed by NMCs deployed to monitor networks for other organizations.

Thus, for example, if a first NMC monitoring a network for Organization A observes or validates a new update server, a second NMC monitoring a network for Organization B may rely on the information previously discovered or confirmed by the first NMC to determine that an update server may be a valid/recognized update server.

In one or more of the various embodiments, NMCs may be arranged to subscribe to one or more third party or external services that publish lists or databases of update servers. Accordingly, in some embodiments, NMCs may be configured to determine update servers based on information included in the one or more published lists or databases.

In some cases, organizations may designate a local (e.g., internal) server as an update server for one or more applications or devices. For example, in some embodiments, updates may be downloaded from a vendor's update server and stored on a local update server. Accordingly, in some embodiments, some update activity may remain within the monitored networks absent communication with external update servers. However, in some embodiments, NMCs may be arranged to identify local/internal update servers similarly to how external update servers may be determined. Also, in some embodiments, NMCs may be arranged to correlate network traffic associated with downloading updates from external repositories onto local update servers with update activity of entities in the monitored networks.

Note, this block is indicated as being optional because in some embodiments, some of the actions to determine the targets of the update requests may have been determined by process 900. Accordingly, in some embodiments, process 1000 may be provided some or all of information for identifying the targets of update requests in the form of, tuple information, MAC addresses, hostnames, or the like, from other processes such as process 900.

At block 1008, in one or more of the various embodiments, NMCs may be arranged to collect one or more beaconing metrics associated with update activity. In one or more of the various embodiments, metrics associated with update activity may include one or more of the metrics described above. In some embodiments, metrics that may be significant for update activity may include, payload size, request size, response size, file names, timing/latency information, or the like. In some embodiments, if the update payload contents may be visible to NMCs, one or more metrics may be based on the update payload contents. For example, in some cases, update payloads may include information, such as, manufacture identity, version information, product identity, or the like. Accordingly, in some embodiments, NMCs may be configured to extract such information from update payloads.

In one or more of the various embodiments, NMCs may be arranged to collect one or more metrics associated with the timing or regularity of update activity. For example, in some cases, vendors may employ regular or otherwise well-known update schedules. Accordingly, in some embodiments, NMCs may be configured to compare published timing/scheduling information with observed update activity. In some embodiments, such metrics may be recorded as timestamp values. Alternatively, in some embodiments, time-based metrics may be recorded or captured as time-series information.

In one or more of the various embodiments, in some cases, some or all previous update activity may be missed or overlooked. Accordingly, in some embodiments, NMCs may be arranged to evaluate cached/captured/archived network traffic to determine one or more update activity metrics. For example, in some embodiments, if an NMC is recently configured to track update activity, network traffic captured prior to configuring the NMC to track update activity may be processed to collect update activity metrics that may be associated with the previously captured network traffic.

Note, one of ordinary skill in the art will appreciate the update activity metrics may vary depending on the type of entity being updated. Accordingly, in some embodiments, NMCs may be arranged to employ rules, instructions, templates, regular expressions, or the like, provided via configuration information to determine the specific update activity metrics to collect.

At block 1010, in one or more of the various embodiments, NMCs may be arranged to update one or more entity profiles associated with the one or more entities based on the beaconing metrics associated with the update activity.

As described above, in one or more of the various embodiments, NMCs may be arranged to generate or maintain entity profiles that track metrics associated with entities in monitored networks. Accordingly, in some embodiments, NMCs may be arranged to update fields (or add fields) to record one or more update activity metrics in entity profiles for one or more entities that may be associated with the update activity. Also, in some embodiments, one or more update activity metrics may be computed from one or more other metrics. Likewise, as described above, one or more metrics associated with update activity may be mapped from continuous values to discrete values such that the discrete values may be stored in entity profile fields.

Also, in some embodiments, NMCs may be arranged to associate one or more entity profiles with network flows, network connections, or the like, rather than being limited to representing applications, computers, servers, or the like.

Likewise, in some embodiments, NMCs may be arranged to associate or maintain entity profiles for classes or types of entities. Accordingly, in some embodiments, NMCs may be arranged to generate entity profiles that represent aggregate or average characteristics that may be associated with update activity for classes or types of entities rather than being limited to individual entities.

In one or more of the various embodiments, NMCs may be configured to generate persistent entity profiles or ephemeral entity profiles. Accordingly, in some embodiments, one or more entity profiles may be associated with timeout values that enable the one or more entity profiles to be considered stale if they are not updated within the timeout period. For example, in some embodiments, NMCs may be configured to discard entity profiles associated with ephemeral entities, such as, compute instances, or the like, in cloud computing environments. Also, in some embodiments, NMCs may be arranged to maintain one or more data structures, such as, buffers, lists, queues, or the like, such that entity profiles may be moved to the top of the buffers, lists, or queues as they are updated and entity profiles at the end of the buffers, lists, or queue may be pushed out/discarded as needed to make room for new or more recently updated entity profiles.

At decision block 1012, in one or more of the various embodiments, if the update activity may be anomalous, control may flow to block 1014; otherwise, control may be returned to a calling process.

In one or more of the various embodiments, NMCs may be arranged to evaluate entity profiles associated with update activity to determine if the update activity may be anomalous, malicious, improper, or otherwise of concern. In some embodiments, NMCs may be arranged to employ various methods to evaluate entity profiles, including one or more machine learning trained classifiers, one or more heuristics, or the like.

For example, for some embodiments, one or more machine learning classifiers may be trained on captured network traffic to recognize anomalous update activity. Likewise, for example, heuristics may compare entity profile field values to ranges of values, threshold values, or the like, to identify anomalous update activity. For example, update activity that may install files that are larger than expected may be flagged as anomalous. Also, for example, for some embodiments, update activity that may be accessing unconventional update servers may be considered anomalous. Similarly, in some embodiments, update activity that occurs too frequently or not as often as expected may be considered anomalous update activity.

In one or more of the various embodiments, NMCs may be arranged to establish base-line threshold values or ranges of values based on observing update activity in a wider community of networks or organizations. Accordingly, in some embodiments, NMCs may be arranged to employ metrics determined from monitoring different networks from the same or different organizations to determine if locally observed update activity may be anomalous. For example, if an NMC has determined that an entity is a database server supplied by a particular vendor, update activity associated with that same particular database server in other networks or other organizations may be compared to update activity of the locally monitored database server. For example, in one or more of the various embodiments, if the same vendor's database is previously updated in network A, NMCs monitoring that network may have flagged the update activity as anomalous because it may be novel update activity. However, if the novel update activity observed in network A is reviewed and confirmed to be safe/valid, NMCs that observe similar activity for the same type of database server hosted in other networks may be configured to consider the previously validated update activity as being of no concern rather anomalous even though the update activity may be novel within the scope of the local network.

Also, in some embodiments, update servers for one or more restricted applications may be well-known. Accordingly, in this example, if a user installs a restricted application on their work computer, such as a music streaming service that the organization has restricted from using on work computers, update activity associated with restricted application may be detected and flagged appropriately.

One of ordinary skill in the art will appreciate that the mechanisms, tests, or conditions for determining any particular update activity as being anomalous may vary depending on many factors, such as, type of application, version of application, network protocols, encryption, communication protocols, local security concerns, local network topology, local policies, or the like. Accordingly, in some embodiments, NMCs may be arranged to employ rules, machine learning models, instructions, conditions, or the like, provided via configuration information to determine if update activity may be anomalous. Also, one of ordinary skill in the art will appreciate that the particular rules, machine learning models, instructions, conditions, or the like, used to determine if update activity may be considered anomalous may be periodically or regularly updated for various reasons, including: to account for changes to update behavior of existing applications; to account for new update activity that may be associated with new applications or devices that may introduced/installed in monitored networks; changes to organization security/IT policies; or the like.

For example, in some embodiments, if one or more auto-updating applications are newly authorized to be installed in a monitored network, NMCs monitoring the network may be updated to include additional rules, machine learning models, instructions, conditions, or the like, to evaluate the update activity associated with the one or more newly authorized applications.

At block 1014, in one or more of the various embodiments, NMCs may be arranged to generate one or more reports or notifications based on the anomalous update activity.

In some embodiments, NMCs may be responsible for identifying anomalous update activity and providing information about the update activity to one or more other services or to one or more users. Accordingly, in some cases, the other services or users may determine a course of action to take in response to the reported update activity. In some embodiments, NMCs may be configured to directly activate or perform one or more mitigation actions, such as, quarantining one or more entities associated with anomalous update activity. However, for brevity and clarity discussion of specific mitigation activity or other responses to anomalous update activity is omitted. Nevertheless, one of ordinary skill in the art will appreciate that other services, processes, whether they are part of an NMC, provided by one or more other internal services, or provided by one or more external/third-party services, may provide the mitigation/response actions as needed.

Next, in one or more of the various embodiments, control may be returned to a calling process.

Figure 11:
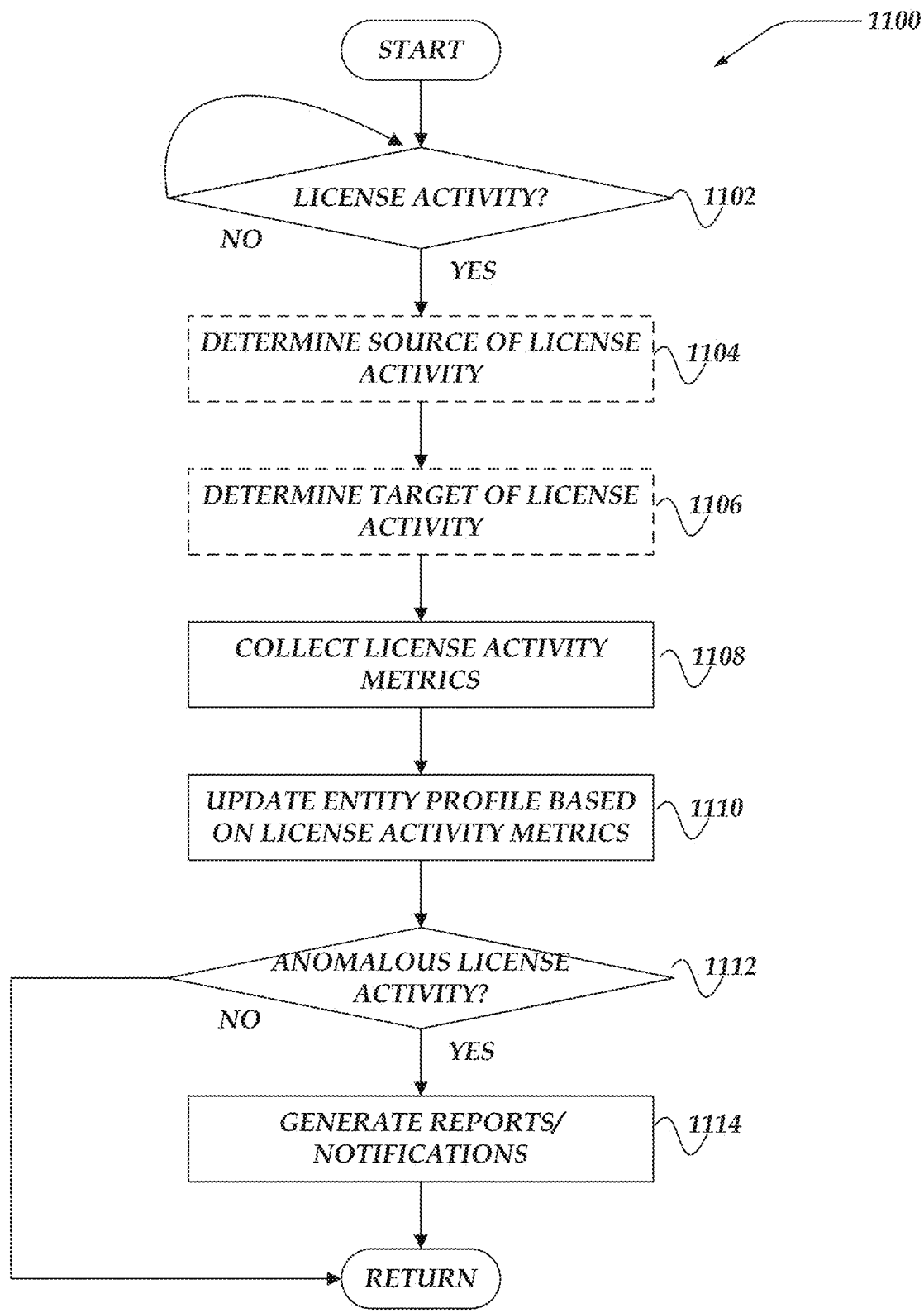
FIG. 11 illustrates a flowchart of a process for identifying network entities based on beaconing activity in accordance with one or more of the various embodiments.

FIG. 11 illustrates a flowchart of process 1100 for identifying network entities based on beaconing activity in accordance with one or more of the various embodiments. After a start block, at decision block 1102, in one or more of the various embodiments, if NMCs observe license activity associated with one or more entities in the monitored network, control may flow to block 1104; otherwise, control may loop back to decision block 1102. As described above, NMCs may be arranged to monitor network traffic to determine if license activity may be occurring.

At block 1104, in one or more of the various embodiments, optionally, NMCs may be arranged to determine the source of the license traffic. In one or more of the various embodiments, NMCs may be arranged to determine the one or more entities in monitored networks that may be sending license requests or otherwise initiating the license activity.

In one or more of the various embodiments, NMCs may be arranged to determine the entities making license requests based on observing the tuple information associated with network traffic that may be associated with the license activity.

In some embodiments, the initiation of license activity may not be immediately recognized as license activity. Accordingly, in some embodiments, NMCs may be arranged to infer that one or more entities may be sending license activity requests after a sufficient amount of evidence has been accumulated. In some embodiments, the amount or type of evidence may vary depending on type of entity, the type of license activity, or the like. For example, if an entity is observed sending a request to a well-known license server, NMCs may be configured to infer that the source of the request may be initiating license activity. In other cases, in some embodiments, NMCs may be configured to infer that an entity is involved with license activity after observing a particular handshake between the source of the license request and the license server. For example, in some embodiments, applications may employ libraries or components that employ a recognizable or well-known application protocol for license activity. Thus, in some embodiments, if NMCs confirm that the license application protocol is being used, the source of the license request (as well as the license server) may be confirmed or inferred. Note, in some cases, vendors of different applications may embed the same third-party license managers. Accordingly, in some cases, NMCs may be configured to recognize the application protocols used by the third-party license managers if they may be used by different applications or services.

Note, this block is indicated as being optional because in some embodiments, some of the actions to determine the sources of license requests may have been determined by process 900. Accordingly, in some embodiments, process 1100 may be provided some or all of information for identifying sources of the license requests in the form of, tuple information, MAC addresses, hostnames, or the like, from other processes such as process 900.

At block 1106, in one or more of the various embodiments, optionally, NMCs may be arranged to determine a target endpoint that may be associated with the license traffic. In some embodiments, license activity may be directed to one or more servers or endpoints that may provide license information for the entity engaging in license activity. In some embodiments, NMCs may be configured to employ a list or database of license servers for various software or hardware manufacturers. Accordingly, in some cases, NMCs may be arranged to confirm that the license requests may be provided to known license servers. In contrast, in some embodiments, NMCs may be arranged to recognize license requests being sent to unknown or unauthorized servers and flag the related network traffic as suspicious network traffic that may require further analysis.

In one or more of the various embodiments, NMCs may be arranged to progressively generate a list or database of license servers based on license activity associated with entities in other networks or other organizations. For example, in some embodiments, NMCs deployed in other networks for different organizations may have previously identified or validated one or more license servers. Accordingly, in some embodiments, NMCs may be arranged to collect some or all of the information associated with the validated license servers in a common database that may be shared or accessed by NMCs deployed to monitor networks for other organizations.

Thus, for example, if a first NMC monitoring a network for Organization A observes or validates a new license server, a second NMC monitoring a network for Organization B may rely on the information previously discovered or confirmed by the first NMC to determine that an license server may be a valid/recognized license server.

In one or more of the various embodiments, NMCs may be arranged to subscribe to one or more third party or external services that publish lists or databases of license servers. Accordingly, in some embodiments, NMCs may be configured to determine license servers based on information included in the one or more published lists or databases.

In some cases, organizations may designate a local (e.g., internal) server as a license server for one or more applications or devices. For example, in some embodiments, license information for an organization may be downloaded from a vendor's license server and stored on a local license server. Accordingly, in some embodiments, some license activity may remain within the monitored networks absent communication with external license servers. However, in some embodiments, NMCs may be arranged to identify local/internal license servers similarly to how external license servers may be determined.

Note, this block is indicated as being optional because in some embodiments, some of the actions to determine the targets of the license requests may have been determined by process 900. Accordingly, in some embodiments, process 1100 may be provided some or all of information for identifying the targets of license requests in the form of, tuple information, MAC addresses, hostnames, or the like, from other processes such as process 900.

At block 1108, in one or more of the various embodiments, NMCs may be arranged to collect one or more beaconing metrics associated with license activity. In one or more of the various embodiments, metrics associated with license activity may include one or more of the metrics described above. In some embodiments, metrics that may be significant for license activity may include, payload size, request size, response size, file names, timing/latency information, or the like. In some embodiments, if the license payload contents may be visible to NMCs, one or more metrics may be based on the license payload contents. For example, in some cases, license payloads may include information, such as, serial numbers, manufacture identity, version information, product identity, or the like. Accordingly, in some embodiments, NMCs may be configured to extract such information from license payloads.

In one or more of the various embodiments, NMCs may be arranged to collect one or more metrics associated with the timing or regularity of license activity. For example, in some cases, vendors may employ regular or otherwise well-known license activity schedules. Accordingly, in some embodiments, NMCs may be configured to compare published or learned timing/scheduling information with observed license activity. In some embodiments, such metrics may be recorded as timestamp values. Alternatively, in some embodiments, time-based metrics may be recorded or captured as time-series information.

In one or more of the various embodiments, in some cases, some or all previous license activity may be missed or overlooked. Accordingly, in some embodiments, NMCs may be arranged to evaluate cached/captured/archived network traffic to determine one or more license activity metrics. For example, in some embodiments, if an NMC is recently configured to track license activity, network traffic captured prior to configuring the NMC to track license activity may be processed to collect license activity metrics that may be associated with the previously captured network traffic.

Note, one of ordinary skill in the art will appreciate the license activity metrics may vary depending on the type of entity being licensed. Accordingly, in some embodiments, NMCs may be arranged to employ rules, instructions, templates, regular expressions, or the like, provided via configuration information to determine the specific license activity metrics to collect.

At block 1110, in one or more of the various embodiments, NMCs may be arranged to update one or more entity profiles associated with the one or more entities based on the beaconing metrics associated with the license activity.

As described above, in one or more of the various embodiments, NMCs may be arranged to generate or maintain entity profiles that track metrics associated with entities in monitored networks. Accordingly, in some embodiments, NMCs may be arranged to update fields (or add fields) to record one or more license activity metrics in entity profiles for one or more entities that may be associated with the license activity. Also, in some embodiments, one or more license activity metrics may be computed from one or more other metrics. Likewise, as described above, one or more metrics associated with license activity may be mapped from continuous values to discrete values such that the discrete values may be stored in entity profile fields.

Also, in some embodiments, NMCs may be arranged to associate one or more entity profiles with network flows, network connections, or the like, rather than being limited to representing applications, computers, servers, or the like.

Likewise, in some embodiments, NMCs may be arranged to associate or maintain entity profiles for classes or types of entities. Accordingly, in some embodiments, NMCs may be arranged to generate entity profiles that represent aggregate or average characteristics that may be associated with license activity for classes or types of entities rather than being limited to individual entities.

In one or more of the various embodiments, NMCs may be configured to generate persistent entity profiles or ephemeral entity profiles. Accordingly, in some embodiments, one or more entity profiles may be associated with timeout values that enable the one or more entity profiles to be considered stale if they are not licensed within the timeout period. For example, in some embodiments, NMCs may be configured to discard entity profiles associated with ephemeral entities, such as, compute instances, or the like, in cloud computing environments. Also, in some embodiments, NMCs may be arranged to maintain one or more data structures, such as, buffers, lists, queues, or the like, such that entity profiles may be moved to the top of the buffers, lists, or queues as they are licensed and entity profiles at the end of the buffers, lists, or queue may be pushed out/discarded as needed to make room for new or more recently licensed entity profiles.

At decision block 1112, in one or more of the various embodiments, if the license activity may be anomalous, control may flow to block 1014; otherwise, control may be returned to a calling process.

In one or more of the various embodiments, NMCs may be arranged to evaluate entity profiles associated with license activity to determine if the license activity may be anomalous, malicious, improper, or otherwise of concern. In some embodiments, NMCs may be arranged to employ various methods to evaluate entity profiles, including one or more machine learning trained classifiers, one or more heuristics, or the like.

For example, for some embodiments, one or more machine learning classifiers may be trained on captured network traffic to recognize anomalous license activity. Likewise, for example, heuristics may compare entity profile field values to ranges of values, threshold values, or the like, to identify anomalous license activity. For example, license activity that may include payloads that are larger than expected may be flagged as anomalous. Also, for example, for some embodiments, license activity that may be accessing unconventional license servers may be considered anomalous. Similarly, in some embodiments, license activity that occurs too frequently or not as often as expected may be considered anomalous license activity.

In one or more of the various embodiments, NMCs may be arranged to establish base-line threshold values or ranges of values based on observing license activity in a wider community of networks or organizations. Accordingly, in some embodiments, NMCs may be arranged to employ metrics determined from monitoring different networks from the same or different organizations to determine if locally observed license activity may be anomalous. For example, if an NMC has determined that an entity is a database server supplied by a particular vendor, license activity associated with that same particular database server in other networks or other organizations may be compared to license activity of the locally monitored database server.

Also, in some embodiments, license servers for one or more restricted applications may be well-known. Accordingly, in this example, if a user installs a restricted application on their work computer, such as a music streaming service that the organization has restricted employees from using on work computers, license activity associated with restricted applications may be detected and flagged appropriately.

One of ordinary skill in the art will appreciate that the mechanisms, tests, or conditions for determining any particular license activity as being anomalous may vary depending on many factors, such as, type of application, version of application, network protocols, encryption, communication protocols, local security concerns, local network topology, local policies, or the like. Accordingly, in some embodiments, NMCs may be arranged to employ rules, machine learning models, instructions, conditions, or the like, provided via configuration information to determine if license activity may be anomalous. Also, one of ordinary skill in the art will appreciate that the particular rules, machine learning models, instructions, conditions, or the like, used to determine if license activity may be considered anomalous may be periodically or regularly licensed for various reasons, including: to account for changes to license behavior of existing applications; to account for new license activity that may be associated with new applications or devices that may introduced/installed in monitored networks; changes to organization security/IT policies; or the like.

At block 1114, in one or more of the various embodiments, NMCs may be arranged to generate one or more reports or notifications based on the anomalous license activity.

In some embodiments, NMCs may be responsible for identifying anomalous license activity and providing information about the license activity to one or more other services or to one or more users. Accordingly, in some cases, the other services or users may determine a course of action to take in response to the reported license activity. In some embodiments, NMCs may be configured to directly activate or perform one or more mitigation actions, such as, quarantining one or more entities associated with anomalous license activity. However, for brevity and clarity discussion of specific mitigation activity or other responses to anomalous license activity is omitted. Nevertheless, one of ordinary skill in the art will appreciate that other services, processes, whether they are part of an NMC, provided by one or more other internal services, or provided by one or more external/third-party services, may provide the mitigation/response actions as needed.

Next, in one or more of the various embodiments, control may be returned to a calling process.

Figure 12:
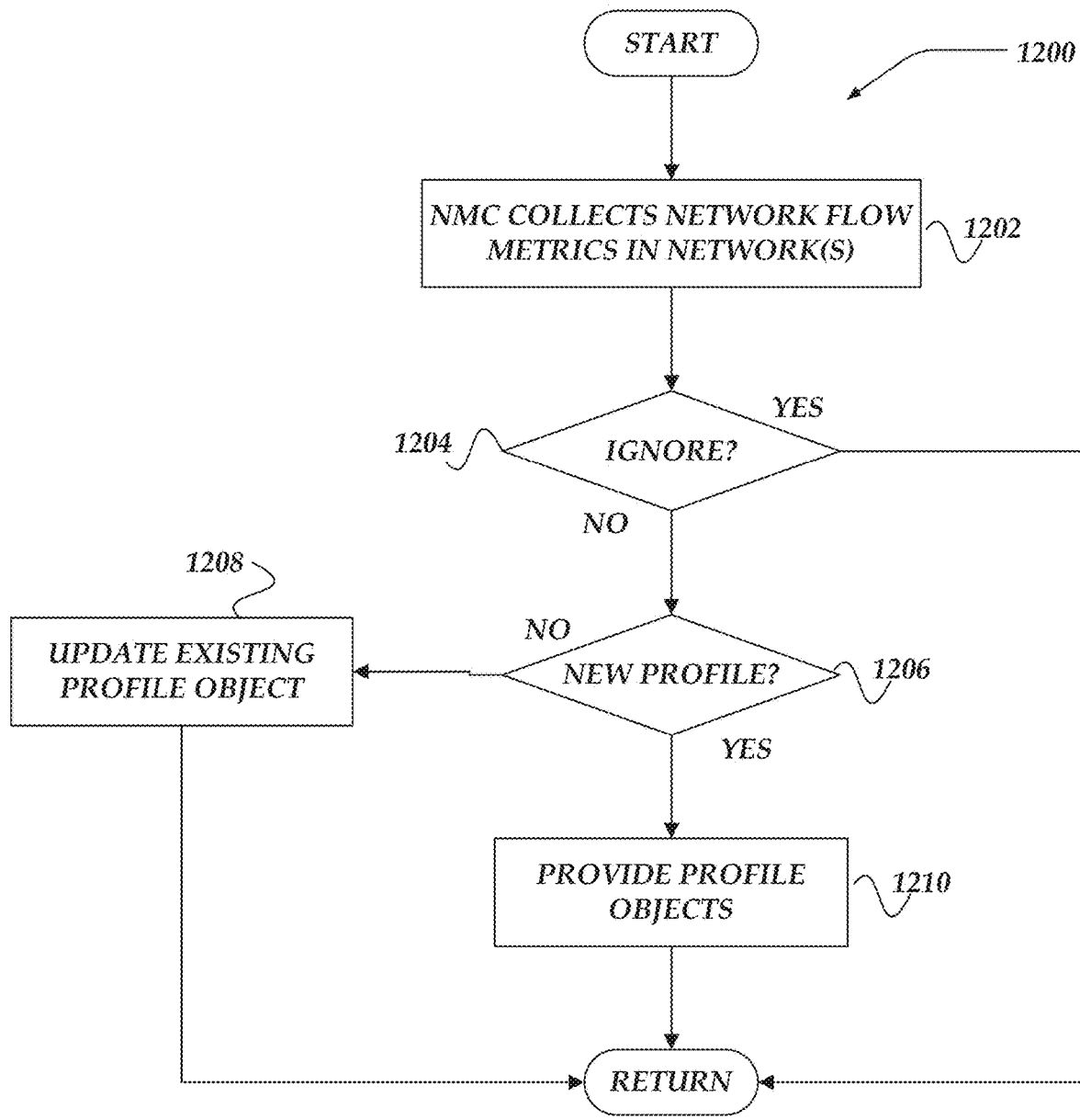
FIG. 12 illustrates a flowchart of a process for progressively providing entity profile objects in accordance with one or more of the various embodiments.

FIG. 12 illustrates a flowchart of process 1200 for progressively providing entity profile objects in accordance with one or more of the various embodiments. After a start block, at block 1202, in at least one of the various embodiments, an NMC may be arranged to network flow metrics in one or more monitored networks. As described above, NMCs may be arranged to collect various metrics based on the network traffic that is on the wire or monitored networks.

At decision block 1204, in one or more of the various embodiments, if the traffic or metrics should be ignored such that profile objects are not relevant, control may flow to decision block 1206; otherwise, control may be returned to a calling process. In one or more of the various embodiments, the NMC may be arranged to selectively determine if network traffic or its associated metrics should be associated with a profile object. In some embodiments, an NMC may be arranged to apply rules or filters to determine if profile objects for network traffic or associated metrics should be provided. In some embodiments, network traffic from some hosts or services may be excluded from the classification, thus maintaining or providing profile objects for such traffic or metrics may be unnecessary.

At decision block 1206, in one or more of the various embodiments, if a new profile object is needed, control may flow to block 1210; otherwise, control may flow to block 1206. In one or more of the various embodiments, the NMC may be arranged to determine if monitored traffic represents a new profile object or if it is associated with an existing profile object.

In one or more of the various embodiments, the NMC may be arranged to execute one or more rules for determining if a new profile object is needed. In some embodiments, these rules or other configuration information may define, patterns, conditions, or the like, the NMC may execute to make this determination. For example, in some embodiments, traffic associated with a previously unseen tuple may be considered to trigger the creation of a new profile object. In other examples, in some embodiments, traffic associated with a previously seen tuple may be considered to require a new profile object if a defined time period has elapsed since the tuple was last observed.

Also, in some embodiments, the NMC may discover that two or more network flows are related or otherwise are associated with the same application, host, device, or the like. Accordingly, in one or more of the various embodiments, a new profile object may be needed to represent the discovered application(s) in addition the profile objects associated with each of the related network flows.

In one or more of the various embodiments, the NMC may be arranged to selectively provide profile objects depending on configuration information, rules, or the like. Accordingly, in some embodiments, an NMC may be arranged to provide profile objects for certain flows and not for other network flows based on one or more defined conditions. In some embodiments, the NMC may be configured to refrain from creating profile objects in every context. For example, in some embodiments, an NMC may be arranged to create profile objects for applications and not for individual network flows.

At block 1208, in one or more of the various embodiments, the NMC may be arranged to update one or more existing profile objects based on the monitored network traffic or metrics. In one or more of the various embodiments, the NMC may be arranged to map some or all of the metrics to fields or attributes of one or more existing profile objects. As mentioned above, in some embodiments, two or more profile objects may be impacted by the same set of metrics. For example, a single metric such as client network address may be updated for multiple profile objects, such as, network flow profile objects (e.g., client-side flow profile object, server-side flow profile object), one or more application profile objects, device objects, network segment profile objects, or the like.

At block 1210, in one or more of the various embodiments, the NMC may be arranged to provide one or more profile objects based on the collected network traffic or network flow metrics. As discussed, the NMC may be arranged to provide one or more profile objects having various contexts or scope depending on the traffic or metrics. In one or more of the various embodiments, the NMC may be arranged to employ configuration information or one or more rule to determine if the context or scope of profile objects. Also, in one or more of the various embodiments, the NMC may be arranged to map the metrics to one or more fields of the new profile objects.

Note, in one or more of the various embodiments, the actions described for block 1208 and block 1210 may overlap. In some embodiments, the collected metrics may trigger new profile objects to be created as well as some existing profile objects to be updated. For example, in some embodiments, metrics associated with a second network flow may indicate that a first network flow and the second network flow are associated with a single application or service. Accordingly, in this example: a new profile object for the second network flow may be created; a new profile object for the application may be created; and the profile object for the first network flow may be updated. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring communication over a network between one or
   more computers, with one or more network monitoring computers (NMCs) that perform actions, comprising:
     determining one or more metrics based on monitoring network traffic associated with a plurality of entities in the network, wherein each entity is associated with a profile that includes the one or more metrics for each entity;
     determining one or more beaconing metrics associated with beaconing activity based on the one or more metrics, wherein the beaconing activity is associated with one or more third parties;
     comparing the profile of each entity with the one or more beaconing metrics, wherein the comparison is employed to determine one or more entities of the plurality of entities that are engaged in beaconing activity;
     characterizing the one or more entities based on its beaconing activity, wherein the beaconing activity includes one or more of communication with one or more endpoints associated with the one or more third parties, employing communication protocols associated with the one or more third-parties, or exchanging payloads consistent with the beaconing activity associated with the one or more third parties;
     determining anomalous activity by the one or more entities or the one or more third parties based on one or more machine learning classifiers trained on captured network traffic to recognize anomalous activity for one or more of beaconing activity, update activity, or license activity; and
     generating one or more reports that include information associated with the one or more entities and its beaconing activity and anomalous activity.

2. The method of claim 1, wherein determining the one or more beaconing metrics, further comprises:
   determining one or more requests from the one or more entities to one or more target endpoints based on the monitored network traffic, wherein the one or more target endpoints are one or more update servers associated with the one or more third parties.

3. The method of claim 1, wherein determining the one or more beaconing metrics further comprises:
   determining one or more requests from the one or more entities to one or more target endpoints based on the monitored network traffic, wherein the one or more target endpoints are one or more license servers associated with the one or more third parties.

4. The method of claim 1, wherein determining the one or more beaconing metrics further comprises:
   determining one or more requests from the one or more entities to one or more target endpoints based on the monitored network traffic, wherein the one or more requests occur at a time associated with the one or more third parties.

5. The method of claim 1, further comprising:
   determining the anomalous beaconing activity based the one or more beaconing metrics, wherein the one or more beaconing metrics are associated with one or more of an unexpected update, an unexpected reboot or restart of an entity, an unexpected target endpoint, an unknown application, or an unknown peripheral device.

6. The method of claim 1, wherein comparing the profile of each entity with the one or more beaconing metrics, further comprises:
   determining one or more other beaconing metrics based on other network traffic monitored in one or more other networks;
   determining other beaconing activity based on the one or more other beaconing metrics;
   providing another comparison of the profile of each entity with the one or more other beaconing metrics; and
   in response to determining the one or more profiles to be inconsistent with the other beaconing activity based on the other comparison of the profile of each entity with the one or more other beaconing metrics, performing one or more actions, including:
     executing one or more rule-based triggers;
     generating one or more notifications; and
     updating the one or more reports to include information associated with the other comparison with the one or more other beaconing metrics.

7. The method of claim 1, wherein determining the one or more entities of the plurality of entities, further comprises:
   providing one or more one or more machine learning models that are trained to predict when the one or more metrics are associated with the beaconing activity;
   generating one or more prediction scores for the one or more entities based on the one or more machine learning models and the one or more metrics; and
   determining the one or more entities based on one or more prediction scores, wherein each of the one or more entities are associated with a prediction score value that exceeds a threshold value.

8. A system for monitoring network traffic in one or more networks:
one or more network monitoring computers (NMCs), comprising:
a memory that stores at least instructions; and
one or more processors that execute instructions that perform actions, including:
determining one or more metrics based on monitoring network traffic associated with a plurality of entities in the network, wherein each entity is associated with a profile that includes the one or more metrics for each entity;
determining one or more beaconing metrics associated with beaconing activity based on the one or more metrics, wherein the beaconing activity is associated with one or more third parties;
comparing the profile of each entity with the one or more beaconing metrics, wherein the comparison is employed to determine one or more entities of the plurality of entities that are engaged in beaconing activity;
characterizing the one or more entities based on its beaconing activity, wherein the beaconing activity includes one or more of communication with one or more endpoints associated with the one or more third parties, employing communication protocols associated with the one or more third-parties, or exchanging payloads consistent with the beaconing activity associated with the one or more third parties;
determining anomalous activity by the one or more entities or the one or more third parties based on one or more machine learning classifiers trained on captured network traffic to recognize anomalous activity for one or more of beaconing activity, update activity, or license activity; and
generating one or more reports that include information associated with the one or more entities and its beaconing activity and anomalous activity; and
one or more client computers, comprising:
a memory that stores at least instructions; and
one or more processors that execute instructions that perform actions, including:
providing one or more portions of the network traffic.

9. The system of claim 8, wherein determining the one or more beaconing metrics, further comprises:
determining one or more requests from the one or more entities to one or more target endpoints based on the monitored network traffic, wherein the one or more target endpoints are one or more update servers associated with the one or more third parties.

10. The system of claim 8, wherein determining the one or more beaconing metrics further comprises:
determining one or more requests from the one or more entities to one or more target endpoints based on the monitored network traffic, wherein the one or more target endpoints are one or more license servers associated with the one or more third parties.

11. The system of claim 8, wherein determining the one or more beaconing metrics further comprises:
determining one or more requests from the one or more entities to one or more target endpoints based on the monitored network traffic, wherein the one or more requests occur at a time associated with the one or more third parties.

12. The system of claim 8, wherein the one or more NMC processors execute instructions that perform actions, further comprising:
determining the anomalous beaconing activity based the one or more beaconing metrics, wherein the one or more beaconing metrics are associated with one or more of an unexpected update, an unexpected reboot or restart of an entity, an unexpected target endpoint, an unknown application, or an unknown peripheral device.

13. The system of claim 8, wherein comparing the profile of each entity with the one or more beaconing metrics, further comprises:
determining one or more other beaconing metrics based on other network traffic monitored in one or more other networks;
determining other beaconing activity based on the one or more other beaconing metrics;
providing another comparison of the profile of each entity with the one or more other beaconing metrics; and
in response to determining the one or more profiles to be inconsistent with the other beaconing activity based on the other comparison of the profile of each entity with the one or more other beaconing metrics, performing one or more actions, including:
executing one or more rule-based triggers;
generating one or more notifications; and
updating the one or more reports to include information associated with the other comparison with the one or more other beaconing metrics.

14. The system of claim 8, wherein determining the one or more entities of the plurality of entities, further comprises:
providing one or more one or more machine learning models that are trained to predict when the one or more metrics are associated with the beaconing activity;
generating one or more prediction scores for the one or more entities based on the one or more machine learning models and the one or more metrics; and
determining the one or more entities based on one or more prediction scores, wherein each of the one or more entities are associated with a prediction score value that exceeds a threshold value.

15. A network monitoring computer (NMC) for monitoring network traffic between one or more computers over one or more networks, comprising:
a memory that stores at least instructions; and
one or more processors that execute instructions that perform actions, including:
determining one or more metrics based on monitoring network traffic associated with a plurality of entities in the network, wherein each entity is associated with a profile that includes the one or more metrics for each entity;
determining one or more beaconing metrics associated with beaconing activity based on the one or more metrics, wherein the beaconing activity is associated with one or more third parties;
comparing the profile of each entity with the one or more beaconing metrics, wherein the comparison is employed to determine one or more entities of the plurality of entities that are engaged in beaconing activity;
characterizing the one or more entities based on its beaconing activity, wherein the beaconing activity includes one or more of communication with one or more endpoints associated with the one or more third parties, employing communication protocols associated with the one or more third-parties, or exchanging payloads consistent with the beaconing activity associated with the one or more third parties;

determining anomalous activity by the one or more entities or the one or more third parties based on one or more machine learning classifiers trained on captured network traffic to recognize anomalous activity for one or more of beaconing activity, update activity, or license activity; and generating one or more reports that include information associated with the one or more entities and its beaconing activity and anomalous activity.

16. The NMC of claim 15, wherein determining the one or more beaconing metrics, further comprises:

determining one or more requests from the one or more entities to one or more target endpoints based on the monitored network traffic, wherein the one or more target endpoints are one or more update servers associated with the one or more third parties.

17. The NMC of claim 15, wherein determining the one or more beaconing metrics further comprises:

determining one or more requests from the one or more entities to one or more target endpoints based on the monitored network traffic, wherein the one or more target endpoints are one or more license servers associated with the one or more third parties.

18. The NMC of claim 15, wherein determining the one or more beaconing metrics further comprises:

determining one or more requests from the one or more entities to one or more target endpoints based on the monitored network traffic, wherein the one or more requests occur at a time associated with the one or more third parties.

19. The NMC of claim 15, wherein the one or more processors execute instructions that perform actions, further comprising:

determining the anomalous beaconing activity based the one or more beaconing metrics, wherein the one or more beaconing metrics are associated with one or more of an unexpected update, an unexpected reboot or restart of an entity, an unexpected target endpoint, an unknown application, or an unknown peripheral device.

20. The NMC of claim 15, wherein comparing the profile of each entity with the one or more beaconing metrics, further comprises:

determining one or more other beaconing metrics based on other network traffic monitored in one or more other networks;

determining other beaconing activity based on the one or more other beaconing metrics;

providing another comparison of the profile of each entity with the one or more other beaconing metrics; and in response to determining the one or more profiles to be inconsistent with the other beaconing activity based on the other comparison of the profile of each entity with the one or more other beaconing metrics, performing one or more actions, including:

executing one or more rule-based triggers;
generating one or more notifications; and
updating the one or more reports to include information associated with the other comparison with the one or more other beaconing metrics.

21. The NMC of claim 15, wherein determining the one or more entities of the plurality of entities, further comprises:

providing one or more one or more machine learning models that are trained to predict when the one or more metrics are associated with the beaconing activity;

generating one or more prediction scores for the one or more entities based on the one or more machine learning models and the one or more metrics; and determining the one or more entities based on one or more prediction scores, wherein each of the one or more entities are associated with a prediction score value that exceeds a threshold value.

22. A processor readable non-transitory storage media that includes instructions for monitoring network traffic using one or more network monitoring computers, wherein execution of the instructions by the one or more networking monitoring computers perform the method comprising:

determining one or more metrics based on monitoring network traffic associated with a plurality of entities in the network, wherein each entity is associated with a profile that includes the one or more metrics for each entity;

determining one or more beaconing metrics associated with beaconing activity based on the one or more metrics, wherein the beaconing activity is associated with one or more third parties;

comparing the profile of each entity with the one or more beaconing metrics, wherein the comparison is employed to determine one or more entities of the plurality of entities that are engaged in beaconing activity;

characterizing the one or more entities based on its beaconing activity, wherein the beaconing activity includes one or more of communication with one or more endpoints associated with the one or more third parties, employing communication protocols associated with the one or more third-parties, or exchanging payloads consistent with the beaconing activity associated with the one or more third parties;

determining anomalous activity by the one or more entities or the one or more third parties based on one or more machine learning classifiers trained on captured network traffic to recognize anomalous activity for one or more of beaconing activity, update activity, or license activity; and generating one or more reports that include information associated with the one or more entities and its beaconing activity and anomalous activity.

23. The media of claim 22, wherein determining the one or more beaconing metrics, further comprises:

determining one or more requests from the one or more entities to one or more target endpoints based on the monitored network traffic, wherein the one or more target endpoints are one or more update servers associated with the one or more third parties.

24. The media of claim 22, wherein determining the one or more beaconing metrics further comprises:

determining one or more requests from the one or more entities to one or more target endpoints based on the monitored network traffic, wherein the one or more target endpoints are one or more license servers associated with the one or more third parties.

25. The media of claim 22, wherein determining the one or more beaconing metrics further comprises:

determining one or more requests from the one or more entities to one or more target endpoints based on the monitored network traffic, wherein the one or more requests occur at a time associated with the one or more third parties.

26. The media of claim 22, further comprising:
determining the anomalous beaconing activity based the one or more beaconing metrics, wherein the one or more beaconing metrics are associated with one or more of an unexpected update, an unexpected reboot or restart of an entity, an unexpected target endpoint, an unknown application, or an unknown peripheral device.

27. The media of claim 22, wherein comparing the profile of each entity with the one or more beaconing metrics, further comprises:
determining one or more other beaconing metrics based on other network traffic monitored in one or more other networks;
determining other beaconing activity based on the one or more other beaconing metrics;
providing another comparison of the profile of each entity with the one or more other beaconing metrics; and
in response to determining the one or more profiles to be inconsistent with the other beaconing activity based on the other comparison of the profile of each entity with the one or more other beaconing metrics, performing one or more actions, including:
executing one or more rule-based triggers;
generating one or more notifications; and
updating the one or more reports to include information associated with the other comparison with the one or more other beaconing metrics.

28. The media of claim 22, wherein determining the one or more entities of the plurality of entities, further comprises:
providing one or more one or more machine learning models that are trained to predict when the one or more metrics are associated with the beaconing activity;
generating one or more prediction scores for the one or more entities based on the one or more machine learning models and the one or more metrics; and
determining the one or more entities based on one or more prediction scores, wherein each of the one or more entities are associated with a prediction score value that exceeds a threshold value.

* * * * *